US012789625B2

(12) United States Patent
Liu et al.

(10) Patent No.: US 12,789,625 B2
(45) Date of Patent: Nov. 10, 2026

(54) DISPLAY DEVICE AND VEHICLE

(71) Applicant: BOE Technology Group Co., Ltd., Beijing (CN)

(72) Inventors: Junhuan Liu, Beijing (CN); Yue Lei, Beijing (CN); Hong Zhu, Beijing (CN); Yue Cui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/126,658

(22) PCT Filed: Nov. 22, 2024

(86) PCT No.: PCT/CN2024/133861

§ 371 (c)(1),
(2) Date: May 2, 2025

(87) PCT Pub. No.: WO2025/130502

PCT Pub. Date: Jun. 26, 2025

(65) Prior Publication Data

US 2025/0381844 A1 Dec. 18, 2025

(30) Foreign Application Priority Data

Dec. 22, 2023 (CN) ......................... 202311791407.6

(51) Int. Cl.
*B60K 35/22* (2024.01)
*G09F 9/30* (2006.01)

(52) U.S. Cl.
CPC ............ *B60K 35/223* (2024.01); *G09F 9/301* (2013.01)

(58) Field of Classification Search
CPC .............................. G09G 9/301; B60K 35/223
See application file for complete search history.

(56) References Cited

U.S. PATENT DOCUMENTS

| | | | | |
|---|---|---|---|---|
| 2021/0213830 | A1 | 7/2021 | Son et al. | |
| 2023/0359245 | A1* | 11/2023 | Ahn | G06F 1/1624 |
| 2025/0388083 | A1* | 12/2025 | Zhao | B60K 35/223 |

FOREIGN PATENT DOCUMENTS

| | | | |
|---|---|---|---|
| CN | 113593411 | A | 11/2021 |
| CN | 113808490 | A | 12/2021 |
| CN | 114461021 | A | 5/2022 |
| CN | 114889532 | A | 8/2022 |
| CN | 115035794 | A | 9/2022 |
| CN | 115529370 | A | 12/2022 |

(Continued)

*Primary Examiner* — Lixi C Simpson
(74) *Attorney, Agent, or Firm* — XSENSUS LLP

(57) ABSTRACT

Provided is a display device. The display device includes: a first housing, comprising: a fixing member, and a slide member slidably connected to the fixing member; a second housing, fixedly connected to a side, away from the slide member, of the fixing member, a roller, comprising: a plurality of sub-rollers arranged in an array, wherein the sub-rollers are rotatably connected to at least one of the first housing or the second housing; a force receiving member, disposed within the second housing and movably connected to the second housing; and a flexible display panel, comprising: a rollable display portion wound over the plurality of sub-rollers, and a first planar display portion and a second planar display portion disposed on both sides of the rollable display portion.

19 Claims, 17 Drawing Sheets

(56) References Cited

FOREIGN PATENT DOCUMENTS

| | | | |
|---|---|---|---|
| CN | 218241211 | U | 1/2023 |
| CN | 116052541 | A | 5/2023 |
| CN | 116343583 | A | 6/2023 |
| CN | 116665540 | A | 8/2023 |

* cited by examiner

DISPLAY DEVICE AND VEHICLE

CROSS-REFERENCE TO RELATED APPLICATIONS

This application is a U.S. national stage of international application No. PCT/CN2024/133861, filed on Nov. 22, 2024, which claims priority to Chinese patent Application No. 202311791407.6, filed on Dec. 22, 2023 and entitled "DISPLAY DEVICE AND VEHICLE," the content of each are incorporated herein by reference in its entirety.

TECHNICAL FIELD

The present disclosure relates to the field of display technology, and in particular, relates to a display device and a vehicle.

BACKGROUND

Typically, a flexible display panel acts as a display screen in a display device. The flexible display panel has advantages such as deformability, bendability, and better flexibility compared to a traditional display panel.

SUMMARY

Embodiments of the present disclosure provide a display device and a vehicle. The technical solutions are as follows.

According to some embodiments of the present disclosure, a display device is provided. The display device includes:

a first housing, including: a fixing member, and a slide member slidably connected to the fixing member;

a second housing, fixedly connected to a side, away from the slide member, of the fixing member, wherein an angle between the first housing and the second housing is less than 180°;

a roller, including: a plurality of sub-rollers arranged in an array, wherein the sub-rollers are rotatably connected to at least one of the first housing or the second housing;

a force receiving member, disposed within the second housing and movably connected to the second housing; and a flexible display panel, including: a rollable display portion wound over the plurality of sub-rollers, and a first planar display portion and a second planar display portion disposed on both sides of the rollable display portion, wherein the first planar display portion is connected to the slide member, and the second planar display portion is connected to the force receiving member within the second housing.

In some embodiments, the sub-roller includes a rotation shaft and a drum sleeved on the shaft;

wherein two ends of the rotation shaft are fixedly connected to the fixing member, and the drum is rotatably connected to the shaft; or two ends of the rotation shaft are rotatably connected to the fixing member, and the drum is fixedly connected to the rotation shaft.

In some embodiments, the display device further includes: a plurality of first support bases and a plurality of second support bases, wherein the plurality of first support bases and the plurality of second support bases are fixedly connected to the fixing member;

wherein the plurality of first support bases and the plurality of second support bases are in one-to-one correspondence with the plurality of sub-rollers, the sub-roller is disposed between the first support base and the second support base corresponding to the sub-roller, a first end of the rotation shaft of the sub-roller is connected to the first support base corresponding to the sub-roller, and a second end of the rotation shaft of the sub-rollers is connected to the second support base corresponding to the sub-roller.

In some embodiments, the first support base and the second support base disposed between two adjacent sub-rollers are fixedly connected to each other.

In some embodiments, the display device further includes a first pulley, a second pulley and a tensioning rope; wherein the first pulley is connected to a side, away from the roller, of the fixing member, and the second pulley is connected to a side, away from the roller, of the second housing; and a first end of the tensioning rope is fixedly connected to a side, close to the roller, of the slide member, the tensioning rope is sequentially wound over the first pulley, the roller, and the second pulley, and a second end of the tensioning rope is fixedly connected to a side, away from the roller, of the force receiving member;

wherein the first end of the tensioning rope is always disposed on a side, toward the roller, of the first pulley during sliding of the slide member relative to the fixing member.

In some embodiments, the display device further includes at least one of a first tensioning assembly or a second tensioning assembly; wherein the first tensioning assembly is connected to the first pulley and the fixing member, and the first tensioning assembly is configured to supply a force in a direction away from the roller to the first pulley; and the second tensioning assembly is connected to the second pulley and the second housing, and the second tensioning assembly is configured to supply a force in a direction away from the roller to the second pulley.

In some embodiments, the first tensioning assembly includes: a first elastic element, a first connection block and a first fastener, wherein an end of the first fastener is fixedly connected to the side, away from the roller, of the fixing member, an extension direction of the first fastener is intersected with the roller, the first connection block and the first elastic element are sleeved on the first fastener, the first elastic element is disposed between the fixing member and the first connection block, two ends of the first elastic element are abutted against the fixing member and the first connection block respectively, an end, away from the fixing member, of the first fastener is abutted against a side, away from the fixing member, of the first connection block, and the first pulley is rotatably connected to the first connection block; and/or the second tensioning assembly includes: a second elastic element, a second connection block and a second fastener, wherein an end of the second fastener is fixedly connected to the side, away from the roller, of the second housing, and an extension direction of the second fastener is intersected with the roller, the second connection block and the second elastic element are sleeved on the second fastener, the second elastic element is disposed between the second housing and the second connection block, two ends of the second elastic element are abutted against the second housing and the second connection block respectively, an end, away from the second housing, of the second fastener is abutted against a side, away from the second housing, of the second connection block, and the second pulley is rotatably connected to the second connection block.

In some embodiments, the first connection block has a first mounting chamber and a first opening communicated with the first mounting chamber, wherein the first pulley is disposed in the first mounting chamber and rotatably connected to the first connection block, the first opening is facing the roller, and the first opening is configured to allow the tensioning rope to run through; and/or the second connection block has a second mounting chamber and a second opening communicated with the second mounting chamber, wherein the second pulley is disposed within the second mounting chamber and rotatably connected to the second connection block, the second opening is facing the roller, and the second opening is configured to allow the tensioning rope to run through.

In some embodiments, the first pulley includes a first pulley body and a first pin, wherein an end of the first pin is connected to the fixing member, and the first pulley body is sleeved on the first pin and rotatably connected to the first pin; and the second pulley includes a second pulley body and a second pin, wherein an end of the second pin is connected to the second housing, the second pulley body is sleeved on the second pin and rotatably connected to the second pin;

wherein an axial direction of the first pin is perpendicular to a plane where the first housing is located, and/or an axial direction of the second pin is perpendicular to a plane where the second housing is located.

In some embodiments, the display device further includes a first drive assembly, wherein the first drive assembly is fixed within the second housing, the first drive assembly is connected to the force receiving member, and the first drive assembly is configured to drive the force receiving member within the second housing to move along a direction perpendicular to the roller.

In some embodiments, the display device further includes: a second drive assembly disposed within the first housing and an elastic restoring assembly fixed within the second housing;

wherein the second drive assembly is connected to the slide member, a portion of the second drive assembly extends into the second housing and is fixedly connected to the second housing, and the elastic restoring assembly is connected to a side, away from the roller, of the force receiving member; and the second drive assembly is configured to drive the slide member within the first housing to move relative to the fixing member along a direction perpendicular to the roller.

In some embodiments, the display device further includes a functional device and a circuit board, the functional device and the second drive assembly being electrically connected to the circuit board;

wherein the functional device and the circuit board are fixed to a side, away from the first planar display portion, of the slide member.

In some embodiments, the second drive assembly includes: a second drive motor, a second transmission shaft and a second transmission member, wherein the second drive motor is fixed to the side, away from the first planar display portion, of the slide member, the second drive motor is connected to an end of the second transmission shaft, and a portion of the second transmission member is sleeved on the second transmission shaft, another portion of the second transmission member extends into the second housing and is fixedly connected to the second housing, and a length direction of the second transmission shaft is parallel to a movement direction of the slide member;

wherein the second drive motor is electrically connected to the circuit board, and the second drive motor is configured to, in response to driving the second transmission shaft to rotate, move along the length direction of the second transmission shaft together with the second transmission shaft.

In some embodiments, the second drive assembly includes: a second drive motor, a second transmission shaft and a second transmission member, wherein the second drive motor is disposed on the side, away from the first planar display portion, of the slide member and fixedly connected to the second housing, the second drive motor is connected to an end of the second transmission shaft, the second transmission member is sleeved on the second transmission shaft, the second transmission member is connected to the side, away from the first planar display portion, of the slide member, a the length direction of the second transmission shaft is parallel to a movement direction of the slide member;

wherein the second drive motor is electrically connected to the circuit board, and the second drive motor is configured to, in response to driving the second transmission shaft to rotate, cause the second transmission member to move the slide member along a direction parallel to the length direction of the second transmission shaft.

In some embodiments, the elastic restoring assembly includes: a support member fixed to a side, away from the roller, of the second housing, and a coil spring connected to the support member, wherein an end of the coil spring is connected to a side, away from the roller, of the force receiving member.

In some embodiments, the support member has a limiting chamber, and an opening region communicated with the limiting chamber, wherein at least a portion of the coil spring is mounted within the limiting chamber, and an end of the coil spring extends out of the limiting chamber through the opening region.

In some embodiments, the support member includes: a first sub-support member and a second sub-support member, wherein a first arcuate slide groove and a third opening communicated with the first arcuate slide groove are disposed in the first sub-support member, and a second arcuate slide groove, and a fourth opening and a fifth opening communicated with the second arcuate slide groove are disposed in the second sub-support member;

wherein the second sub-support member is connected to the first sub-support member at the third opening, the second arcuate slide groove is communicated with the first arcuate slide groove through the fourth opening and the third opening, the second arcuate slide groove and the first arcuate slide groove are configured to enclose the limiting chamber, and the fifth opening and a region not covered by the second sub-support member within the third opening enclose the opening region.

In some embodiments, a plurality of weight-reducing recesses are formed in the inner wall of the limiting chamber.

In some embodiments, the slide member includes a plurality of first guide rods arranged in parallel; and the fixing member includes a plurality of second guide rods arranged in parallel;

wherein the plurality of first guide rods and the plurality of second guide rods are alternately arranged in rows.

According to some embodiments, a vehicle is provided. The vehicle includes:

a display device fixed within a cabin of the vehicle, wherein the display device is any one of the display device in the above embodiments.

BRIEF DESCRIPTION OF DRAWINGS

For clearer descriptions of the technical solutions according to the embodiments of the present disclosure, the following briefly introduces the accompanying drawings required for describing the embodiments. Apparently, the accompanying drawings in the following description show merely some examples of the present disclosure, and those of ordinary skill in the art may still derive other drawings from these accompanying drawings without creative efforts.

Definite embodiments of the present disclosure have been shown by the above accompanying drawings, which will be described in more detail later. These accompanying drawings and textual descriptions are not intended to limit the scope of the present disclosure in any way, but rather to illustrate the concepts of the present disclosure for those skilled in the art by reference to particular embodiments.

DETAILED DESCRIPTION

For clearer descriptions of the objectives, technical solutions, and advantages of the present disclosure, the embodiments of the present disclosure are further described in detail below referring to the accompanying drawings.

The display device typically includes a flexible display panel and a drive structure. The flexible display panel may be unrolled or rolled by virtue of the drive structure, such that the display device is switchable between an unrolled state and a rolled state, and dimensions of the display surface of the display device may be adjusted.

However, the flexible display panel is susceptible to buckling or collapsing when switched between the unrolled state and the rolled state.

Figure 1:
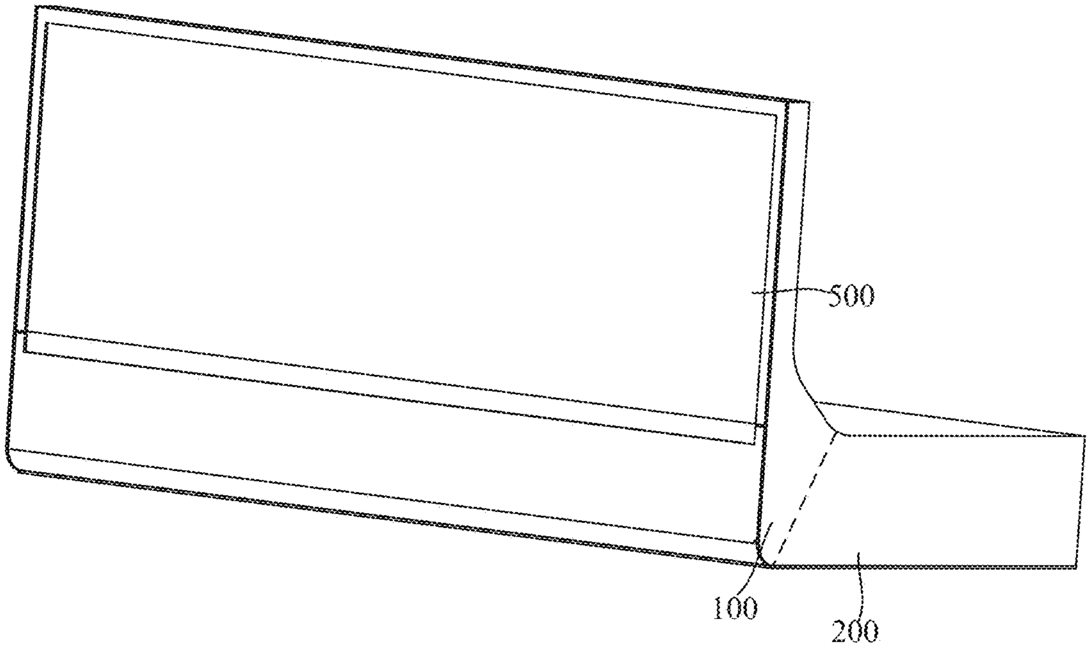
FIG. 1 is a schematic diagram of an external structure of a display device according to some embodiments of the present disclosure.
Figure 2:
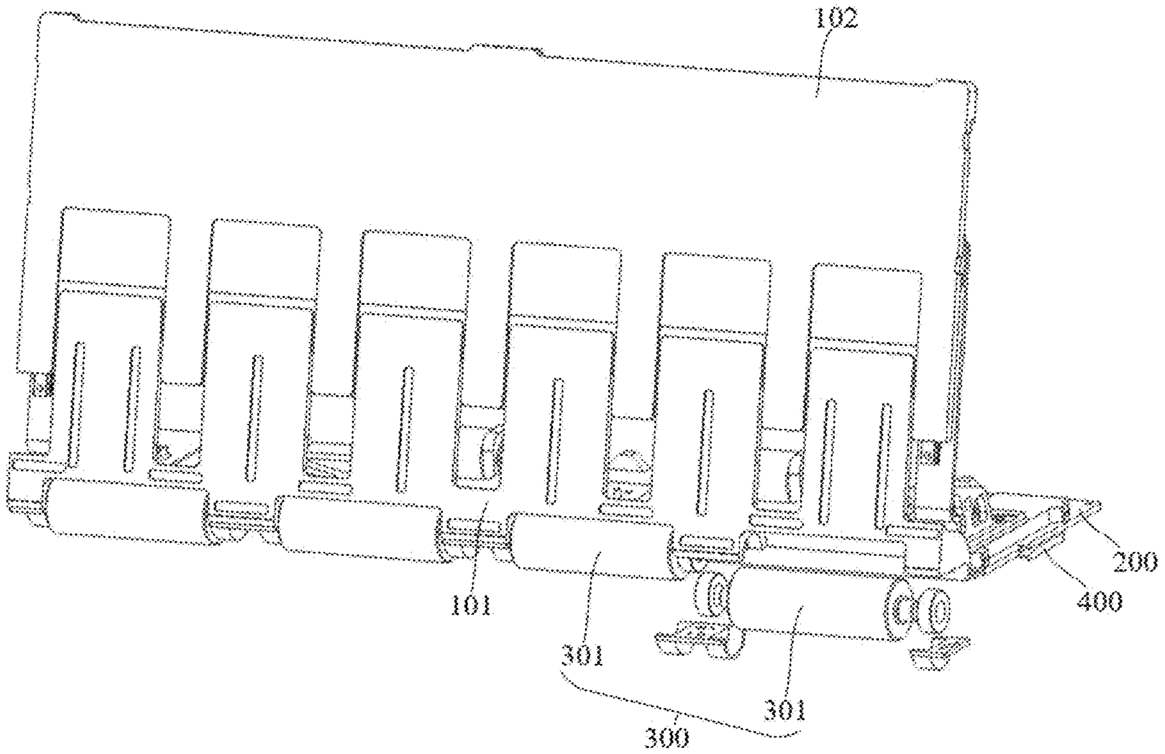
FIG. 2 is a schematic diagram of a partial structure of a display device according to some embodiments of the present disclosure.

Referring to FIGS. 1 and 2, FIG. 1 is a schematic diagram of an external structure of a display device according to some embodiments of the present disclosure, and FIG. 2 is a schematic diagram of a partial structure of a display device according to some embodiments of the present disclosure. The display device includes a first housing 100, a second housing 200, a roller 300, a force receiving member 400, and a flexible display panel 500.

The first housing 100 in the display device includes a fixing member 101, and a slide member 102 slidably connected to the fixing member 101.

The second housing 200 in the display device is fixedly connected to a side, away from the slide member 102, of the fixing member 101, and the angle between the first housing 100 and the second housing 200 is less than 180 degrees.

The roller 300 in the display device includes a plurality of sub-rollers 301 arranged in an array, and each sub-roller 301 is rotatably connected to at least one of the first housing 100 or the second housing 200.

The force receiving member 400 in the display device is disposed within the second housing 200 and is movably connected to the second housing 200. In order to see the position of the force receiving member clearly, only a portion of the structure of the second housing 200 is shown in FIG. 2.

Figure 3:
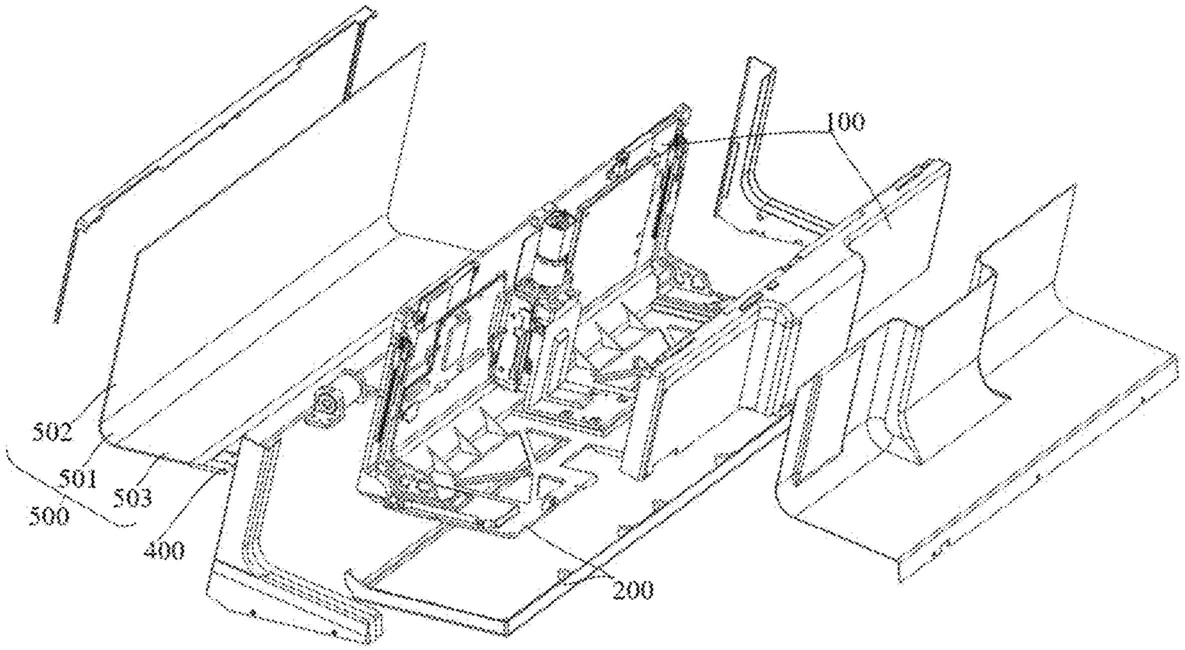
FIG. 3 is an exploded schematic diagram of a partial structure of a display device according to some embodiments of the present disclosure.
Figure 4:
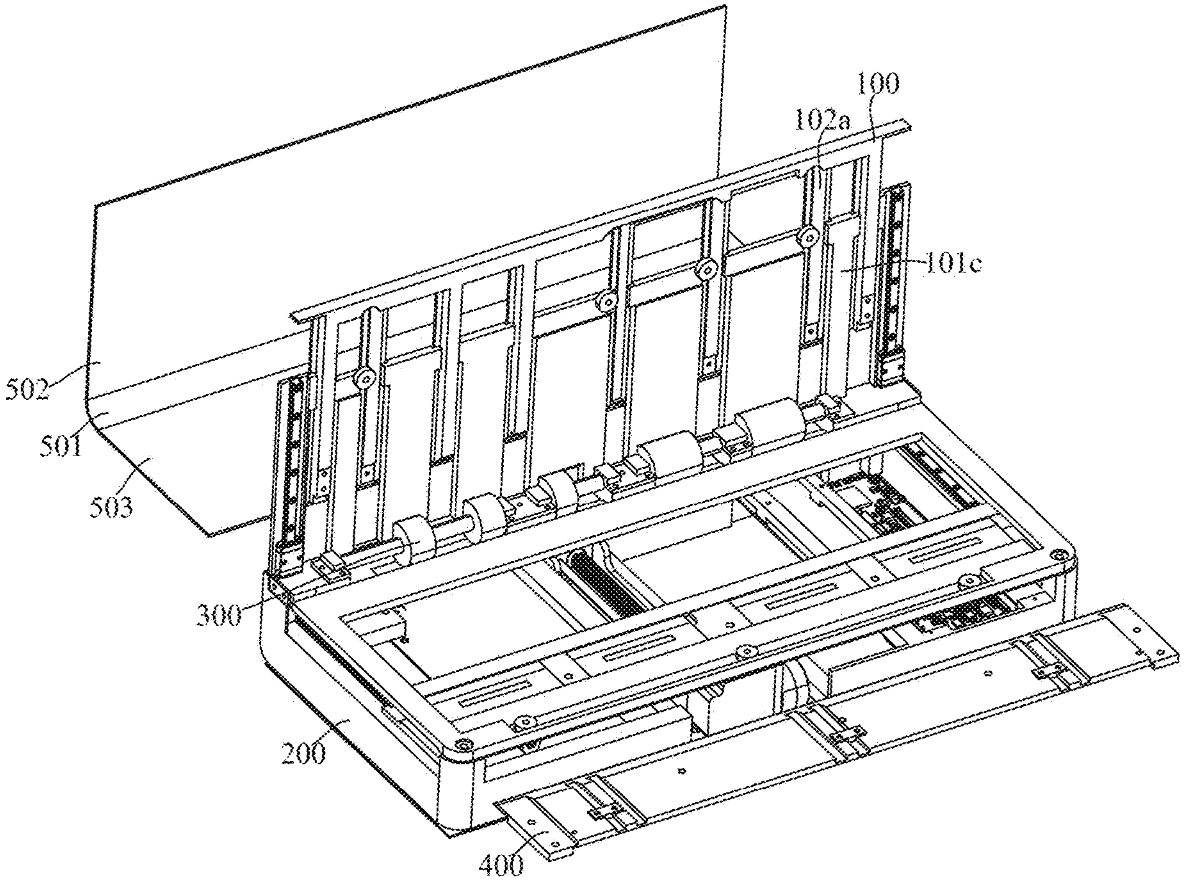
FIG. 4 is an exploded schematic diagram of a partial structure of another display device according to some embodiments of the present disclosure.

Referring to FIGS. 3 and 4, FIG. 3 is an exploded schematic diagram of a partial structure of a display device according to some embodiments of the present disclosure, and FIG. 4 is an exploded schematic diagram of a partial structure of another display device according to some embodiments of the present disclosure. The flexible display panel 500 in the display device includes a rollable display portion 501 wound over the plurality of sub-rollers 301, and a first planar display portion 502 and a second planar display portion 503 disposed on both sides of the rollable display portion 501. The first planar display portion 502 in the flexible display panel 500 is connected to the slide member 102, and the second planar display portion 503 in the second housing 200 is connected to the force receiving member 400.

In some embodiments of the present disclosure, by providing the roller 300 between the first housing 100 and the second housing 200, and in the case that the first planar display portion 502 of the flexible display panel 500 is connected to the slide member 102 and the second planar display portion 503 is connected to the force receiving member 400, the rollable display portion 501 in the flexible display panel 500 can be wound over the roller 300. The roller 300 is rotatably connected to the housing, such that indirect rotation of the rollable display portion 501 in the flexible display panel 500 is achieved when the rollable display portion 501 passes over the roller region, and the friction of the rollable display portion 501 in the flexible display panel 500 is reduced, in order to reduce the frictional resistance of the display device in the case that the display device is switched between the unrolled state and the rolled state. In addition, by arranging the roller 300 including a plurality of sub-rollers 301 arranged in an array, the sub-rollers 301 are shorter and easy to be processed, the axial accuracy of the sub-roller 301 can be ensured, and the coaxial degree of the formed roller can be ensured to be better upon assembling the plurality of sub-rollers 301 on the housing, such that the rollable display portion 501 in the flexible display panel 500 does not have the undesirable phenomenon of warping or collapsing when the rollable display portion 501 passes over the roller region, and a better display effect of the flexible display panel 500 in the display device is ensured.

For example, the flexible display panel 500 in the display device is capable of flexibly adjusting the dimension of the display surface of the flexible display panel in the process of unrolling and rolling, such that the flexible display panel 500 is applicable to different use scenarios. For example, in the case that the display device is applied to a transportation (e.g., a vehicle), it is possible to flexibly adjust the extension dimension of the flexible display panel of the display device, such that the flexible display panel is applicable to different usage scenarios of the vehicle. In this way, the requirements for user entertainment and safety can be satisfied, and the installation space requirements are lower for the vehicle. In particular, for the large-dimension flexible display panel, the dimension of the flexible display panel can be adjusted based on different usage scenarios in the vehicle environment. For example, in the case that the vehicle is moving, a portion of the flexible display panel is disposed in the internal space of the display device to reduce the display area of the flexible display panel, and a smaller display is used to provide driving information of the vehicle, which provides a good driving field of view. In the case that the vehicle is in an entertainment state, a larger portion or all of the flexible display panel extends out of the internal space of the display device, increasing the display area and satisfying the user's entertainment requirements.

In summary, the display device according to the embodiments of the present disclosure includes the first housing, the second housing, the roller, the force receiving member, and the flexible display panel. By providing the roller between the first housing and the second housing, and in the case that a first planar display portion of the flexible display panel is connected to the slide member and a second planar display portion is connected to the force receiving member, the rollable display portion in the flexible display panel can be wound over the roller. The roller is rotatably connected to the housing, such that indirect rotation of the rollable display portion in the flexible display panel is achieved when the rollable display portion passes over the roller region, and the friction of the rollable display portion in the flexible display panel is reduced, in order to reduce the frictional resistance of the display device in the case that the display device is switched between the unrolled state and the rolled state. In addition, by arranging the roller including a plurality of sub-rollers arranged in an array, the sub-rollers are shorter and easy to be processed, the axial accuracy of the sub-roller can be ensured, and the coaxial degree of the formed roller can be ensured to be better upon assembling the plurality of sub-rollers on the housing, such that the rollable display portion in the flexible display panel is not susceptible to buckling or collapsing when the rollable display portion passes over the roller region, and a better display effect of the flexible display panel in the display device is ensured.

Figure 5:
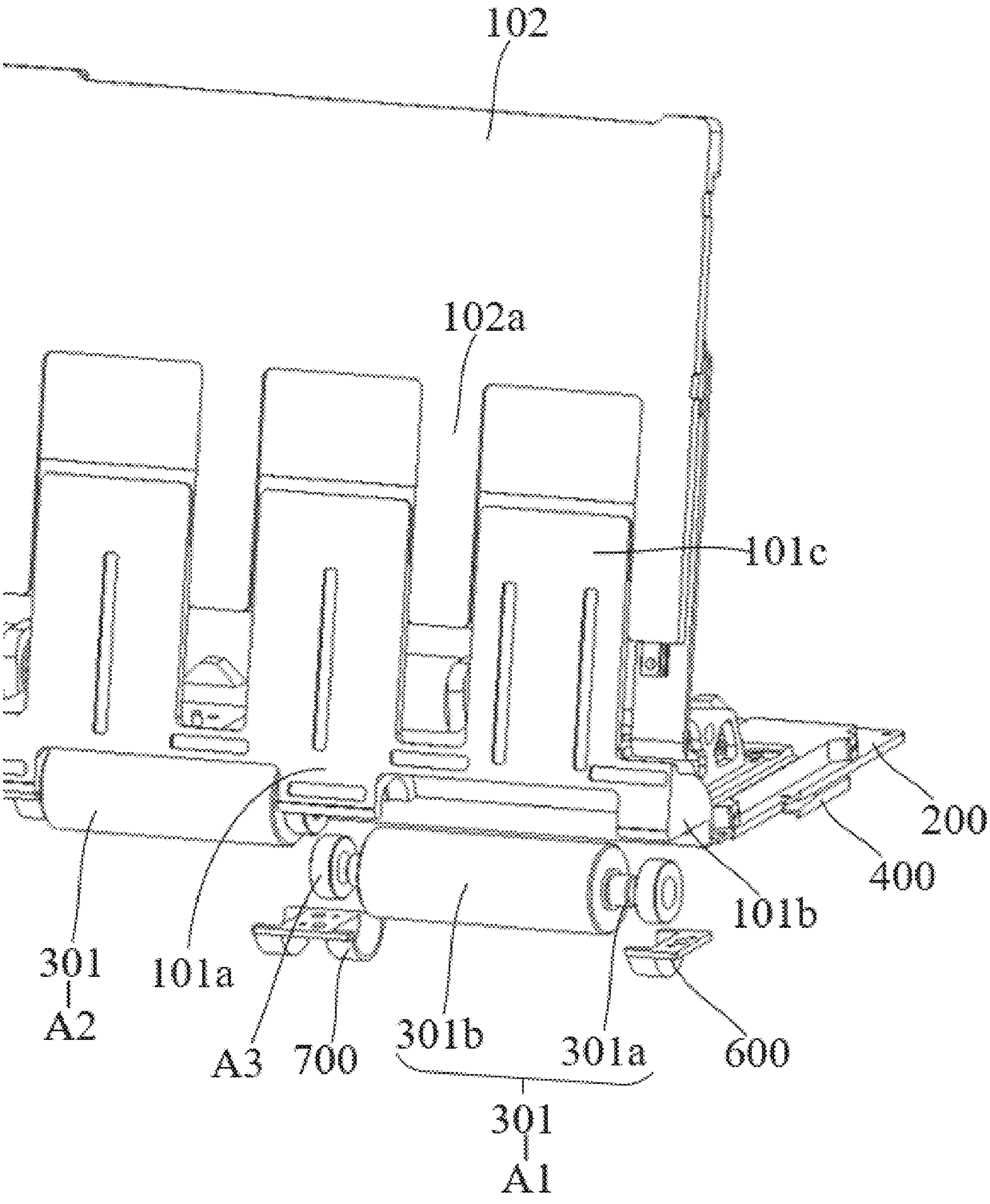
FIG. 5 is a schematic diagram of a connection between a sub-roller and a housing according to some embodiments of the present disclosure.

Optionally, referring to FIG. 5, FIG. 5 is a schematic diagram of a connection between a sub-roller and a housing according to some embodiments of the present disclosure. Each of the sub-roller 301 of the roller 300 includes a rotation shaft 301*a* and a drum 301*b* sleeved on the rotation shaft 301*a*. Two ends of the rotation shaft 301*a* are fixedly connected to the fixing member 101, and the drum 301*b* is rotatably connected to the rotation shaft 301*a*. Alternatively, two ends of the rotation shaft 301*a* are rotatably connected to the fixing member 101, and the drum 301*b* is fixedly connected to the rotation shaft 301*a*.

In some embodiments of the present disclosure, as shown in FIG. 5, the display device further includes a plurality of first support bases 600 and a plurality of second support bases 700. The plurality of first support bases 600 and the plurality of second support bases 700 are fixedly connected to the fixing member 101. The plurality of first support bases 600 and the plurality of second support bases 700 are in one-to-one correspondence with the plurality of sub-rollers 301, each of the plurality of sub-rollers 301 is disposed between the first support base 600 and the second support base 700 corresponding to the sub-roller 301, a first end of the rotation shaft 301*a* of the sub-roller 301 is connected to the first support base 600 corresponding to the sub-roller 301, and a second end of the rotation shaft 301*a* of the sub-rollers 301 is connected to the second support base 700 corresponding to the sub-roller 301. In this way, each of the sub-roller 301 corresponds to a group of the first support base 600 and the second support base 700, and upon connecting the ends of the rotation shaft 301*a* of the sub-roller 301 to the first support base 600 and the second support base 700 respectively, the first support base 600 and the second support base 700 are secured to the fixing member 101. In this way, in the case that the sub-roller 301 ensures the assembling accuracy with the first support base 600 and the second support base 700 through the rotation shaft 301*a*, only the assembling accuracy of the first support base 600 and the second support base 700 with the fixing member 101 is needed to be ensured, that is, the assembling accuracy of the roller 300 with the housing can be ensured. It is to be noted that the deviation formed during the processing of the long rotation shaft can be compensated for by adjusting the assembling accuracy of the ends of the rotation shaft 301*a* of the sub-roller 301 with the two support bases, and the assembling accuracy of the two support bases with the fixing member 101.

For example, as shown in FIG. 5, the plurality of sub-rollers 301 includes two first sub-rollers A1 disposed at the outermost ends, and at least one second sub-roller A2 disposed between the two first sub-rollers A1. The fixing member 101 has a plurality of first extension portions 101*a* and two second extension portions 101*b*, and the first extension portion 101*a* is disposed between the adjacent first sub-roller A1 and the second sub-roller A2, and/or, disposed between two adjacent second sub-rollers A2. The second extension portion 101*b* is disposed on a side, away from the second sub-roller A2, of the first sub-roller A1. The first support base 600 corresponding to the first sub-roller A1 is fixedly connected to the second extension portion 101*b*, and the second support base 700 corresponding to the first sub-roller A1 is fixedly connected to the first extension portion 101*a*. The first support base 600 corresponding to the second sub-roller A2 is fixedly connected to the first extension portion 101*a*, and the second support base 700 corresponding to the second sub-roller A2 is fixedly connected to the first extension portion 101*a*.

It should be noted that the ends of the rotation shaft 301*a* of the sub-roller 301 are rotatably connected to the corresponding first support base 600 and second support base 700, and the drum 301*b* can be fixedly connected to the rotation shaft 301*a*. In the present disclosure, as shown in FIG. 5, the display device further includes two first bearings A3 corresponding to a group of the first support base 600 and the second support base 700, an outer ring of one first bearing A3 is fixedly connected to the first support base 600, and an inner ring of one first bearing A3 is sleeved on one end of the rotation shaft 301*a*; and an outer ring of the other first bearing A3 is fixedly connected to the second support base 700, and the inner ring of the other first bearing A3 is sleeved on the other end of the rotation shaft 301*a*. In this way, the two ends of the rotation shaft 301*a* are connected to the first support base 600 and the second support base 700 respectively through the first bearing A3, which can effectively ensure the mounting accuracy of the rotation shaft 301*a* of each sub-roller 301 with the two support bases, and the smooth sliding of the rotation shaft 301*a* in the sub-roller 301 relative to the two support bases is ensured.

Optionally, as shown in FIG. 5, the first support base 600 and the second support base 700 disposed between two adjacent sub-rollers 301 are fixedly connected. That is, in the two adjacent sub-rollers 301, the second support base 700 connected to one end of one sub-roller 301 and the first support base 600 connected to one end of the other sub-roller 301 are integrally formed.

In the embodiments of the present disclosure, for the tensioning system for tensioning the flexible display panel in the display device during switching between the unrolled state and the rolled state, the embodiments of the present disclosure have a plurality of implements, and the following two optional implementations are illustrated schematically as examples.

Figure 6:
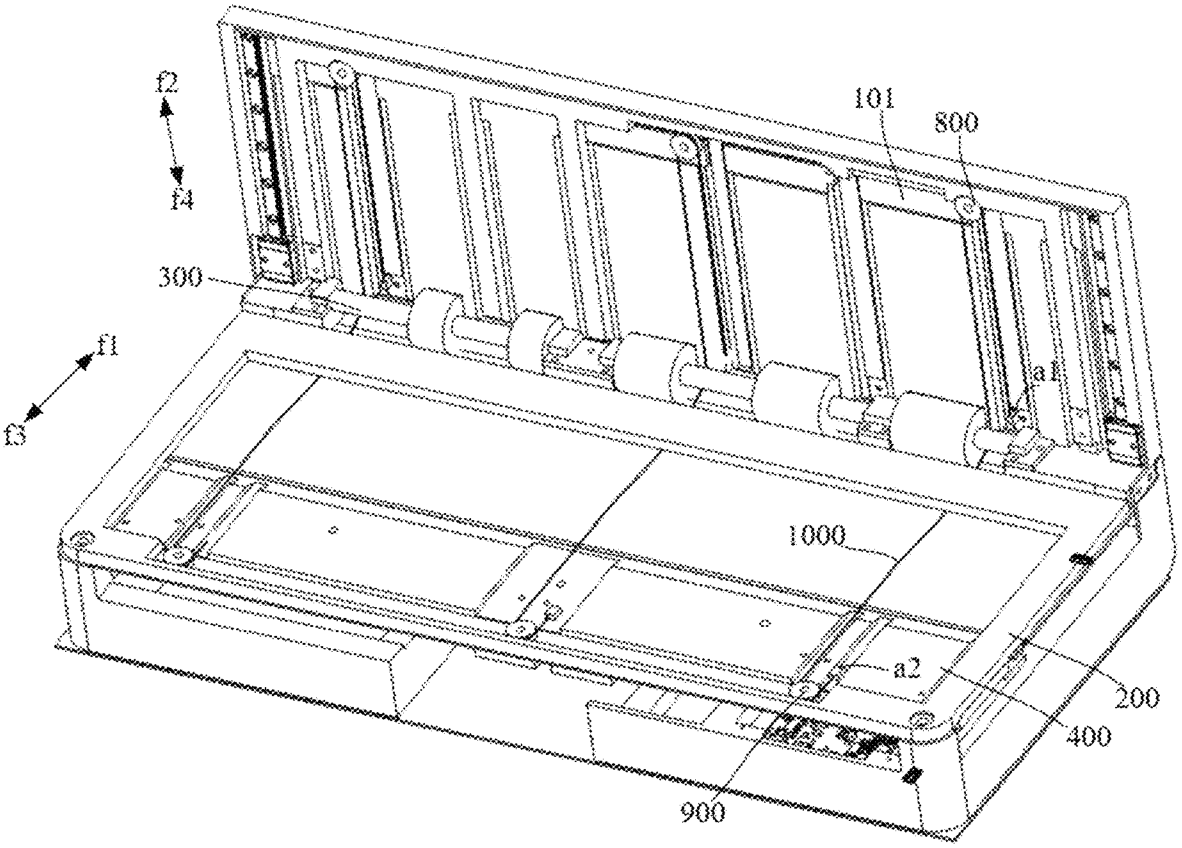
FIG. 6 is a schematic diagram of an effect of a display device in a rolled state according to some embodiments of the present disclosure.
Figure 7:
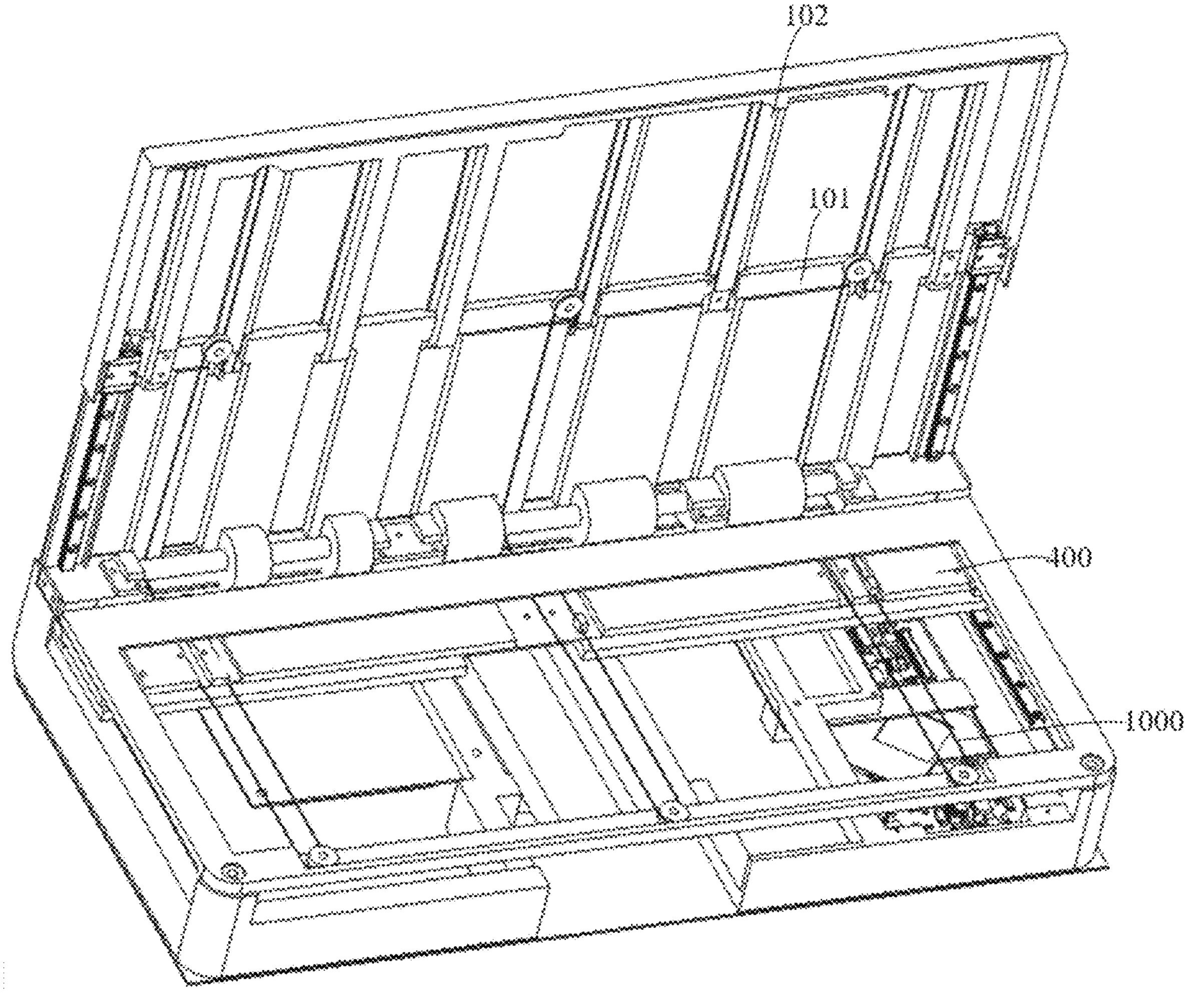
FIG. 7 is a schematic diagram of an effect of a display device in an unrolled state according to some embodiments of the present disclosure.

In the first optional implementation, referring to FIG. 6 and FIG. 7, FIG. 6 is a schematic diagram of an effect of a display device in a rolled state according to some embodiments of the present disclosure, and FIG. 7 is a schematic diagram of an effect of a display device in an unrolled state according to some embodiments of the present disclosure. The display device further includes a first pulley 800, a second pulley 900, and a tensioning rope 1000. The first pulley 800 is connected to a side, away from the roller 300, of the fixing member 101, and the second pulley 900 is connected to a side, away from the roller 300, of the second housing 200. The first end a1 of the tensioning rope 1000 is fixedly connected to the side, close to the roller 300, of the slide member 102, and the tensioning rope 1000 is sequentially wrapped over the first pulley 800, the roller 300, and the second pulley 900, and a second end a2 of the tensioning rope 1000 is fixedly connected to the side, away from the roller 300, of the force receiving member 400. During sliding of the slide member 102 relative to the fixing member 101, the first end a1 of the tensioning rope 1000 is always disposed on the side, toward the roller 300, of the first pulley 800. For example, in the case that the force receiving member 400 is moved in the f1-axis direction by an external force, the force receiving member 400 can drive the second end a2 of the tensioning rope 1000 to move along a direction close to the roller 300. The tensioning rope 1000 wrapped over the first pulley 800 and the second pulley 900 can move under the action of the pulleys, such that the first end a1 of the tensioning rope 1000 can drive the slide member 102 to move in the f2-axis direction relative to the fixing member 101, and the entire flexible display panel 500 is driven to be unrolled by the first planar display portion 502. In this way, the coordination of the tensioning rope 1000 with the two pulleys can provide a drive force for the movement of the slide member 102 while unrolling the flexible display panel 500, which can reduce the required force of the driving assemblies in the display device and facilitate the reduction of manufacturing costs. In addition, in the case that the force receiving member 400 is moved in the f3-axis direction by an external force, the force receiving member 400 can move the second end a2 of the tensioning rope 1000 in a direction away from the roller 300 by applying a force to the second planar display portion 503 in the flexible display panel 500, and the force receiving member 400 can drive the second end a2 of the tensioning rope 1000 to move along a direction away from the roller 300. The tensioning rope 1000 wrapped over the first pulley 800 and the second pulley 900 moves under the action of the pulleys, such that the first end a1 of the tensioning rope 1000 can drive the slide member 102 to move relative to the fixing member 101 in the f4-axis direction, thereby achieving the unrolling of the display device. It is to be noted that the first pulley 800 can act as a fixed pulley to change the direction of the force on the tensioning rope 1000 upon being connected to the fixing member 101, and the second pulley 900 can act as a fixed pulley to change the direction of the force on the tensioning rope upon being connected to the second housing 200.

Figure 8:
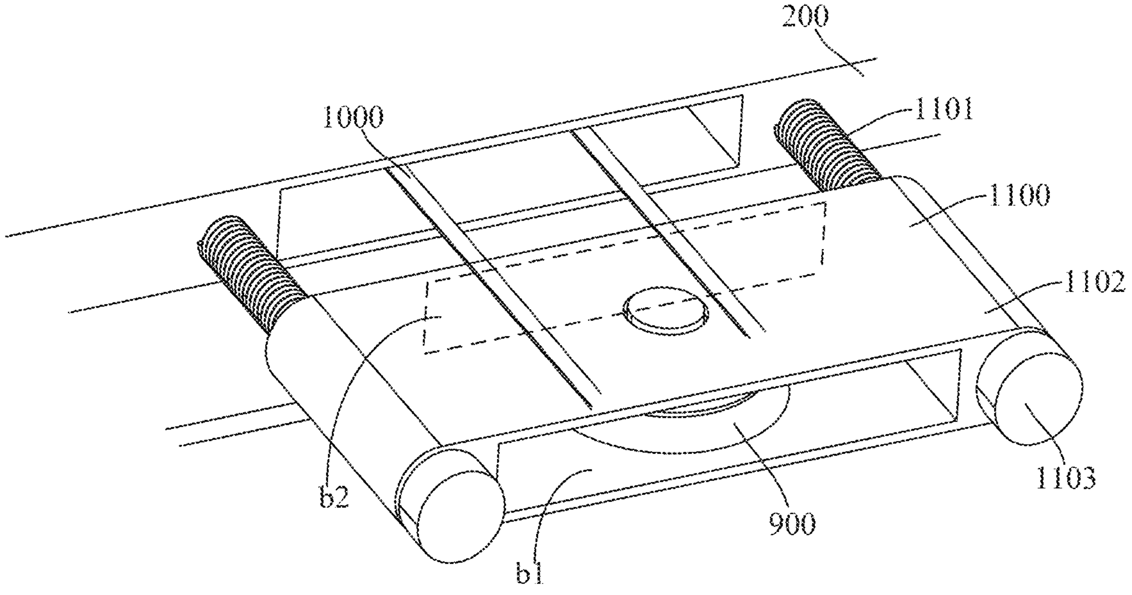
FIG. 8 is a schematic diagram of a partial structure of another display device according to some embodiments of the present disclosure.

Optionally, referring to FIGS. 7 and 8, FIG. 8 is a schematic diagram of a portion of the structure of another display device according to some embodiments of the present disclosure. The display device further includes a first tensioning assembly (not shown in the figures) and/or a second tensioning assembly 1100, the first tensioning assembly is connected to the first pulley 800 and the fixing member 101. The first tensioning assembly is configured to apply a force to the first pulley 800 in a direction away from the roller 300. The second tensioning assembly 1100 is connected to the second pulley 900 and the second housing 200. The second tensioning assembly 1100 is configured to apply a force to the second pulley 900 in the direction of the away from the roller 300. It is noted that the first tensioning assembly provides tensioning force to the tensioning rope 1000 via the first pulley 800 in the same manner as the second tensioning assembly 1100 provides tensioning force to the tensioning rope 1000 via the second pulley 900, and the following embodiments are illustrated schematically with the second tensioning assembly 1100 as an example. In this way, by the second tensioning assembly 1100 applying a force to the second pulley 900 along the direction of away from the roller 300, it is possible to provide a certain pre-tensioning force to the tensioning rope 1000, which further ensures that the bulge of the flexible display panel 500 in the display device when switched between the unrolled state and the rolled state is small.

In the present disclosure, the first tensioning assembly includes a first elastic element, a first connection block, and a first fastener, an end of the first fastener is fixedly connected to a side, away from the roll axis, of the fixing member, an extension direction of the first fastener is intersected with the roller, and the first connection block and the first elastic element are sleeved on the first fastener. The first elastic element is disposed between the fixing member and the first connection block, two ends of the first elastic element are abutted against the fixing member and the first connection block respectively, an end, away from the fixing member, of the first fastening member is abutted against the side, away from the fixing member, of the first connection block, and the first pulley is rotatably connected to the first connection block.

And/or, as shown in FIG. 8, the second tensioning assembly 1100 includes a second elastic element 1101, a second connection block 1102, and a second fastener 1103, an end of the second fastener 1103 is fixedly connected to a side, away from the roller 300, of the second housing 200, an extension direction of the second fastener 1103 is intersected with an extension direction of the roller 300, and the second connection block 1102 and the second elastic element 1101 are sleeved on the second fastener 1103. The second elastic element 1101 is disposed between the second housing 200 and the second connection block 1102, two ends of the second elastic element 1101 is abutted against the second housing 200 and the second connection block 1102 respectively, an end, away from the second housing 200, of the second fastener 1103 is abutted against the side, away from the second housing 200, of the second connection block 1102, and the second pulley 900 is rotatably connected to the second connection block 1102. In this way, by arranging the end, away from the second housing 200, of the second fastener 1103 against the side, away from the second housing 200, of the second connection block 1102, the second elastic element 1101 disposed between the second housing 200 and the second connection block 1102 can apply a force along the direction away from the second housing 200 on the second connection block 1102, and through the second pulley 900 directly apply a force along the direction away from the second housing 200 to the tensioning rope wrapped over the second pulley 900, such that a pre-tensioning force is always present in the tensioning rope 1000. For example, both the first fastener and the second fastener 1103 are fastening screws, and the first elastic element and the second elastic element 1101 are compression springs.

In some embodiments of the present disclosure, the first connection block in the display device has a first mounting chamber, and a first opening communicated with the first mounting chamber, and the first pulley is disposed in the first mounting chamber and rotatably connected to the first connection block. The first opening in the first connection block is facing the roller, and the first opening is configured to allow the tensioning rope to run through. For example, a first end of the tensioning rope is threaded into the first mounting chamber by the first opening to wrap over the first pulley and then out of the first opening to be connected to the slide member.

And/or, as shown in FIG. 8, the second connection block 1102 has a second mounting chamber b1 and a second opening b2 communicated with this second mounting chamber b1, and the second pulley 900 is disposed within the second mounting chamber b1 and rotatably connected to the second connection block 1102. The second openings b2 in the second connection block 1102 is facing the roller 300, and the second opening b2 is configured to allow the tensioning rope 1000 to run through. For example, the second end of the tensioning rope 1000 is connected to the force receiving member 400 through the second opening b2 threading into the second mounting chamber b1 and then out of the second opening b2 upon winding over the second pulley 900. In this way, the second pulley 900 is disposed within the second mounting chamber b1 and rotatably connected to the second connection block 1102 by providing the second mounting chamber b1 and the second opening b2 communicated with the second mounting chamber b1 in the second connection block 1102. In this way, the integration degree of the display device is improved, and the overall dimension of the display device can be effectively reduced.

Figure 9:
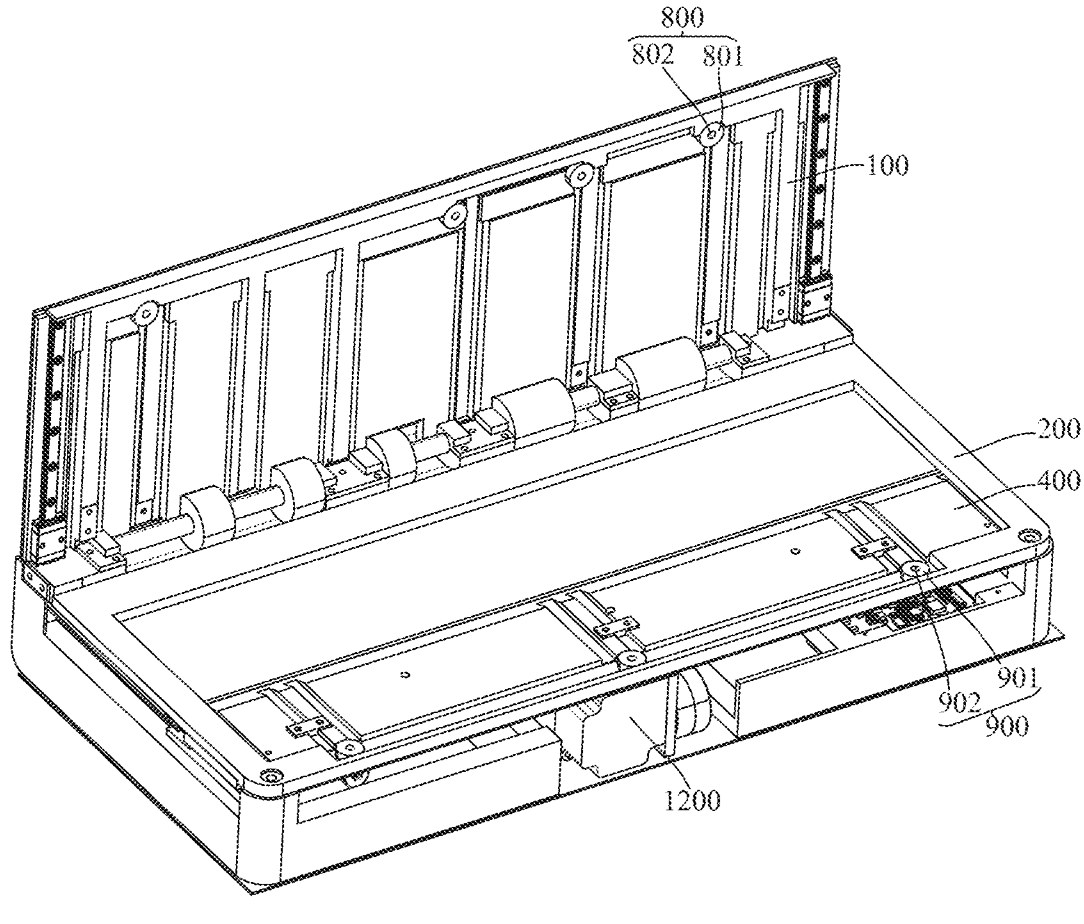
FIG. 9 is a schematic diagram of a partial structure of still another display device according to some embodiments of the present disclosure.

Optionally, referring to FIG. 9, FIG. 9 is a schematic diagram of a partial structure of still another display device according to some embodiments of the present disclosure. The first pulley 800 of the display device includes a first pulley body 801 and a first pin 802, an end of the first pin 802 is connected to the fixing member 101, and the first pulley body 801 is sleeved on the first pin 802 and rotatably connected to the first pin 802. The second pulley 900 of the display device includes a second pulley body 901 and a second pin 902, an end of the second pin 902 is connected to the second housing 200, and the second pulley body 901 is sleeved on the second pin 902 and rotatably connected to the second pin 902. The axial direction of the first pin 802 is perpendicular to a plane where the first housing 100 is located, and/or the axial direction of the second pin 902 is perpendicular to a plane where the second housing 200 is located. In this way, the first pulley body 801 is connected to the fixing member 101 via the first pin 802, and the second pulley body 901 is connected to the second housing 200 via the second pin 902, and the axial direction of the first pin 802 is perpendicular to the plane where the first housing 100 is located, and the axial direction of the second pin 902 is perpendicular to the plane where the second housing 200 is located. That is, the first pulley body 801 and the second pulley body 901 are mounted in a flat position, such that the overall thickness of the display device along the direction perpendicular to the plane where the first housing 100 is located, and along the direction perpendicular to the plane where the second housing 200 is located are both smaller. It is to be noted that in other possible implementations, the axial direction of the first pin 802 is parallel to the plane where the first housing 100 is located, both ends of the first pin 802 are connected to the fixing member 101, the axial direction of the second pin 902 is also parallel to the plane where the second housing is located, and both ends of the second pin 902 is connected to the second housing 200.

In some embodiments of the present disclosure, as shown in FIG. 9, the display device further includes a first drive assembly 1200, the first drive assembly 1200 is fixed within the second housing 200, and the first drive assembly 1200 is connected to the force receiving member 400. The first drive assembly 1200 is configured to drive the force receiving member 400 within the second housing 200 to move along a direction perpendicular to the roller 300. In the present disclosure, the display device further includes a control assembly (not shown in the figures) electrically connected to the first drive assembly, and the control assembly controls the first drive assembly to perform normal operation upon receiving a drive instruction. In this way, by providing the first drive assembly 1200 in the display device, the force receiving member 400 is driven to move by the first drive assembly 1200, thereby driving the flexible display panel 500 in the display device to unroll or roll, and the degree of automation of the display device is improved.

Figure 10:
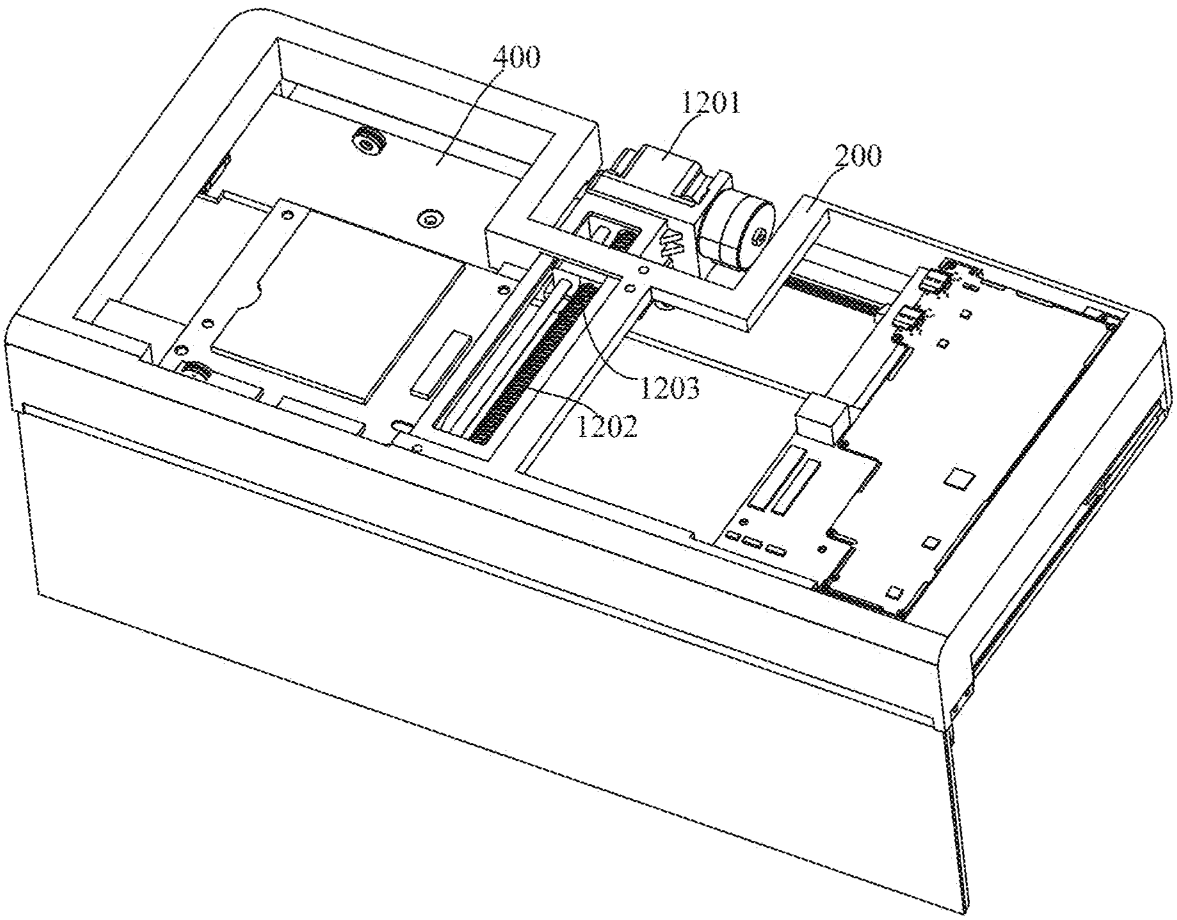
FIG. 10 is a schematic diagram of a partial structure of still another display device according to some embodiments of the present disclosure.

For example, referring to FIG. 10, FIG. 10 is a schematic diagram of a partial structure of still another display device according to some embodiments of the present disclosure. The first drive assembly 1200 includes a first drive motor 1201, a first transmission shaft 1202, and a first transmission member 1203. The first drive motor 1201 is fixedly connected to the second housing 200, and the first drive motor 1201 is connected to an end of the first transmission shaft 1202. The first transfer member 1203 is sleeved on the first transmission shaft 1202, the first transmission shaft 1202 is vertically aligned with the roller 300, and the first transfer member 1203 is connected to the force receiving member 400. The first drive motor 1201 is configured to drive the force receiving member 400 to move along a length direction of the first transmission shaft 1202 via the first transfer member 1203 in the case that the first drive motor 1201 drives the first transmission shaft 1202 to rotate. In this way, in the case that the first drive motor 1201 is operating, the first drive motor 1201 can drive the first transmission shaft 1202 to rotate, and during the rotation of the first transmission shaft 1202, the first transmission member 1203 can be driven to move on the first transmission shaft 1202, such that the force receiving member 400 can be driven by the first transmission member 1203 to move in the length direction of the first transmission shaft 1202. In the case that the flexible display panel 500 of the display device is moved to the determined position, the first drive motor 1201 stops working.

Figure 11:
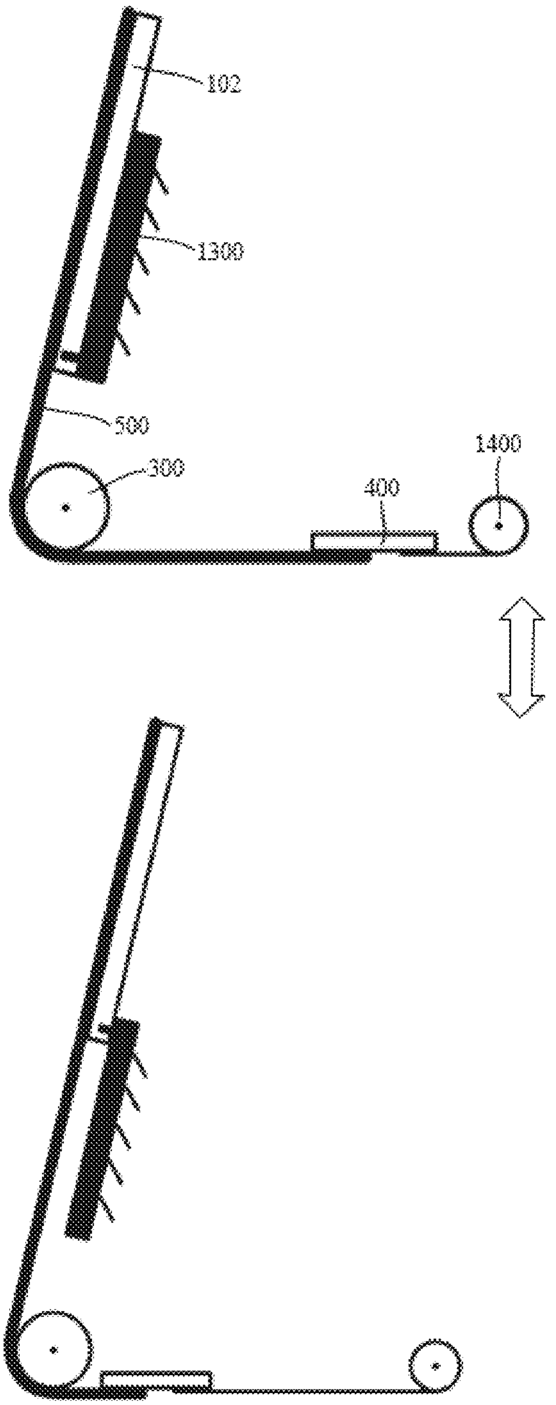
FIG. 11 is a schematic diagram of the effect of a display device switched between an unrolled state and a rolled state according to some embodiments of the present disclosure.

In a second optional implementation, referring to FIG. 11, FIG. 11 is a schematic diagram of the effect of switching between an unrolled state and a rolled state of a display device according to some embodiments of the present disclosure. The display device further includes a second drive assembly 1300 disposed within the first housing 100, and an elastic restoring assembly 1400 fixed within the second housing 200. The second drive assembly 1300 is connected to the slide member 102 within the first housing 100, a portion of the second drive assembly 1300 extends into the second housing 200 and is fixedly connected to the second housing 200, and the elastic restoring assembly 1400 is connected to a side, away from the roller 300, of the force receiving member 400. The second drive assembly 1300 is configured to drive the slide member 102 within the first housing 100 to move relative to the fixed member 102 along a direction perpendicular to the roller 300. In this way, by connecting the second drive assembly 1300 to the slide member 102, the second drive assembly 1300 is enabled to drive the slide member 102 to move relative to the fixing member 101, and the entire flexible display panel 500 is driven to be unrolled or rolled by the first planar display portion 502. In addition, the elastic restoring assembly 1400 fixed within the second housing 200 is connected to the force receiving member 400, and in the process of driving the force receiving member 400 via the second planar display portion 503, the elastic restoring assembly 1400 always applies a force along the direction of away from the roller 300 to the force receiving member 400, such that the force receiving member 400 applied a tensioning force to the flexible display panel 500 to flatten the entire flexible display panel 500.

Figure 12:
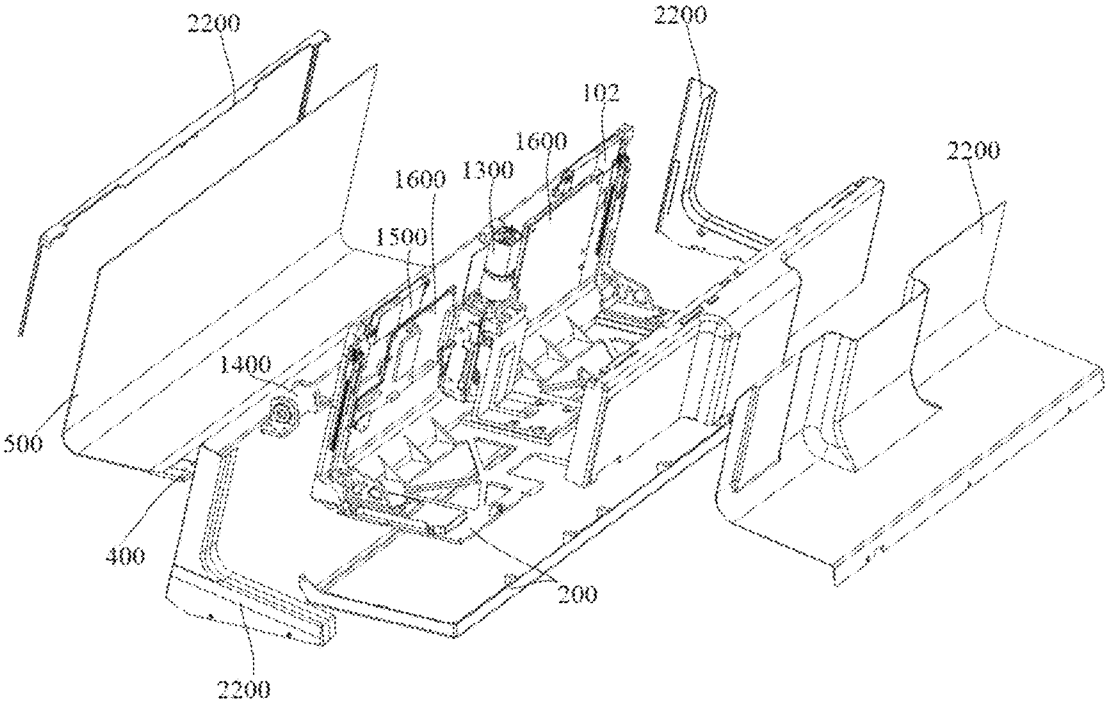
FIG. 12 is a schematic diagram of an exploded structure of a display device according to some embodiments of the present disclosure.
Figure 13:
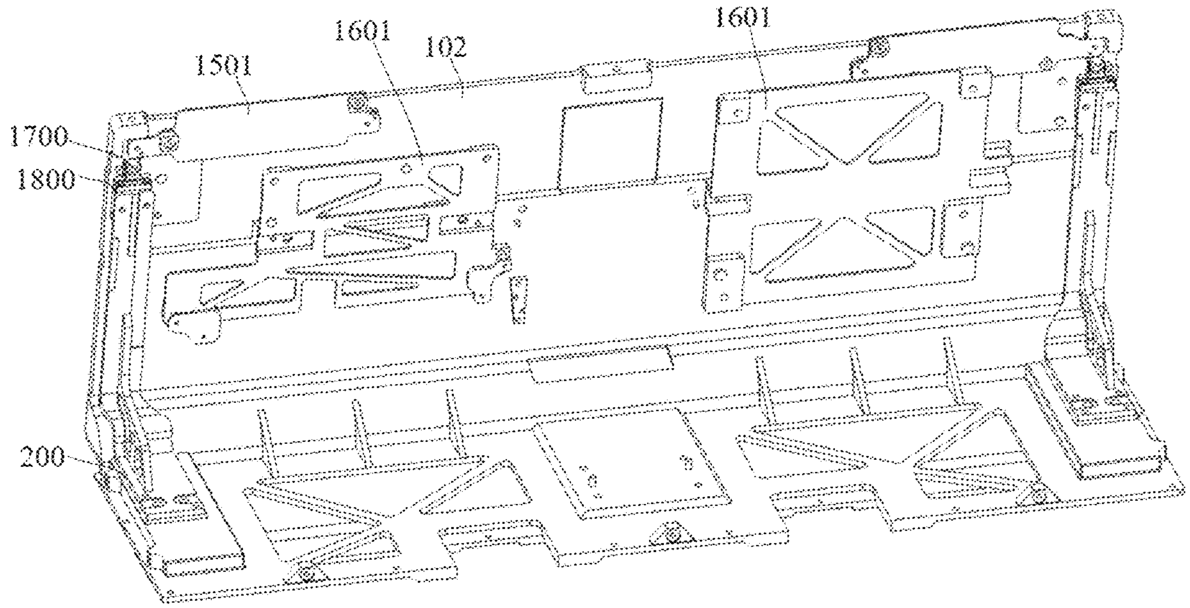
FIG. 13 is a schematic diagram of a partial structure of the display device illustrated in FIG. 12.

Optionally, referring to FIG. 12 and FIG. 13, FIG. 12 is an exploded structural schematic diagram of a display device according to some embodiments of the present disclosure, and FIG. 13 is a schematic diagram of a partial structure of the display device illustrated in FIG. 12. The display device further includes a functional device 1500 and a circuit board 1600, and the functional device 1500 and the second drive assembly 1300 are electrically connected to the circuit board 1600. The functional device 1500 and the circuit board 1600 are fixed to a side, away from the first planar display portion 502, of the slide member 102 of the flexible display panel 500. For example, the functional device 1500 and the second drive assembly 1300 are electrically connected to a PCB or FPC, which is electrically connected to a mainboard (not shown in the figure) of the display device. In the present disclosure, as shown in FIG. 13, the functional device 1500 includes a device body (e.g., an audio) and a first connection plate 1501, the device body is fixed on one side of the first connection plate 1501, and the other side of the first connection plate 1501 is fixedly connected to the slide member 102. The circuit board 1600 includes a circuit board body and a second connection plate 1601, the circuit board body is fixed on one side of the second connection plate 1601, and the other side of the second connection plate 1601 is fixedly connected to the slide member 102.

In the embodiments of the present disclosure, there are two possible manners in which the second drive assembly 1300 is connected to the slide member 102 and the second housing 200, which are schematically illustrated in the following embodiments of the present disclosure.

Figure 14:
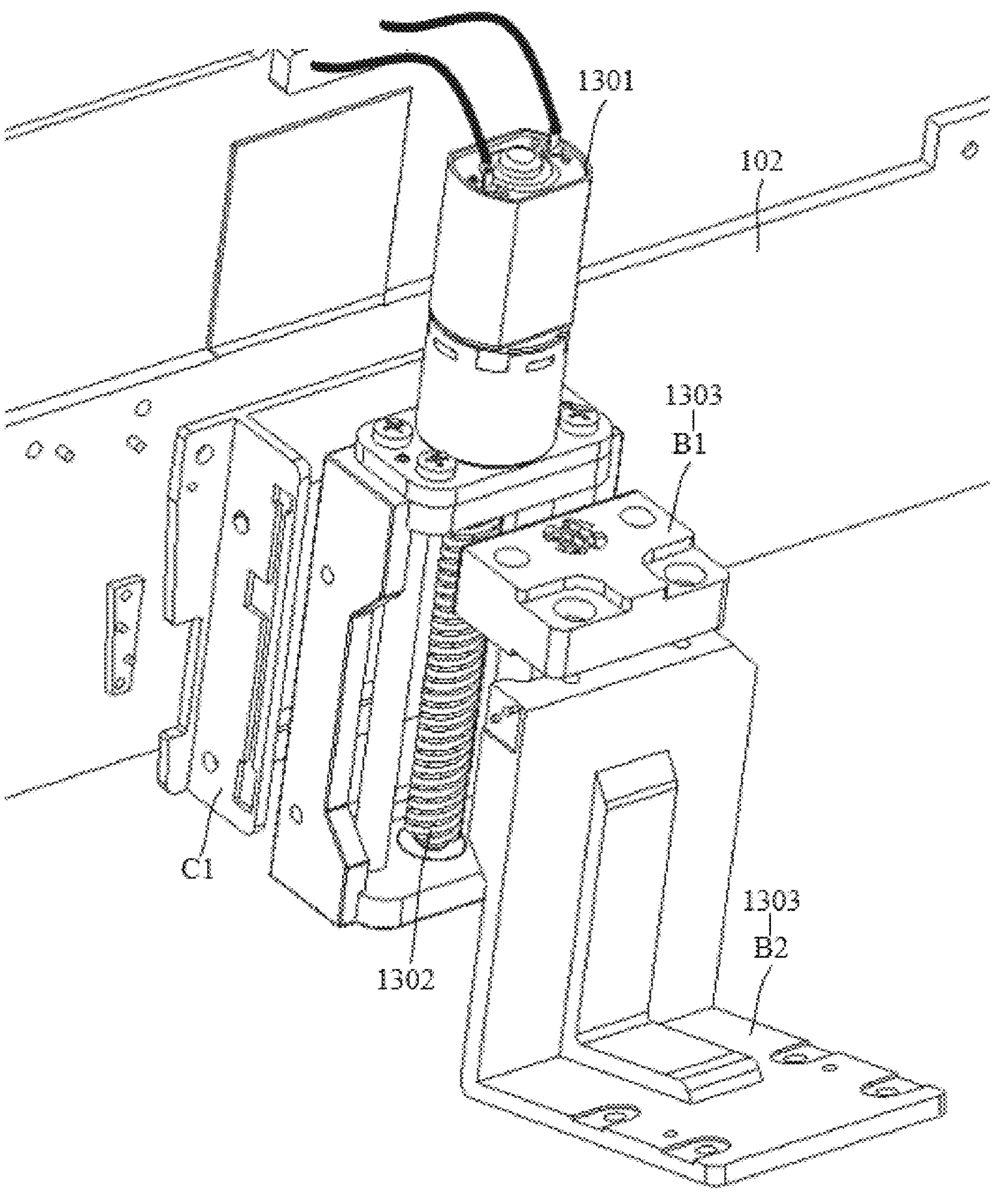
FIG. 14 is an exploded schematic assembling diagram of a second drive assembly according to some embodiments of the present disclosure.

In a first possible embodiment, referring to FIGS. 12 and 14, FIG. 14 is an exploded schematic assembling diagram of a second drive assembly according to some embodiments of the present disclosure. The second drive assembly 1300 includes a second drive motor 1301, a second transmission shaft 1302, and a second transmission member 1303. The second drive motor 1301 is fixed to a side, away from the first planar display portion 502, of the slide member 102 in the flexible display panel 500, and the second drive motor 1301 is connected to an end of the second transmission shaft 1302. A portion of the second transmission member 1303 is sleeved on the second transmission shaft 1302, another portion of the second transmission member 1303 extends into the second housing 200 to be fixedly connected to the second housing 200, and a length direction of the second transmission shaft 1302 is parallel to a moving direction of the slide member 102. The second drive motor 1301 is electrically connected to the circuit board 1600, and the second drive motor 1301 is configured to move along the length direction of the second transmission shaft 1302 with the second transmission shaft 1302 in the case that the second transmission shaft 1302 is driven to rotate. In this way, upon fixing the second drive motor 1301 with the slide member 102, the second drive motor 1301 can move along with the slide member 102 during the switching the display device between the unrolled state and the rolled state, and the second drive motor 1301 is relatively stationary with the circuit board (e.g., the flexible circuit board FPC), which can effectively reduce the risk of the circuit board failing.

For example, as shown in FIG. 14, the second transmission member 1303 includes a second transmission member body B1 and a third support base B2, the second transmission member body B1 is sleeved on the second transmission shaft 1302 and fixedly connected to the third support base B2, and the third support base B2 is fixedly connected to the second housing 200. The display device further includes a fourth support base C1 disposed between the slide member 102 and the second drive motor 1301, one side of the fourth support base C1 is fixedly connected to the second drive motor 1301, and the other side of the fourth support base C1 is fixedly connected to the slide member 102, such that the second drive motor 1301 is fixed to the slide member 102.

Figure 15:
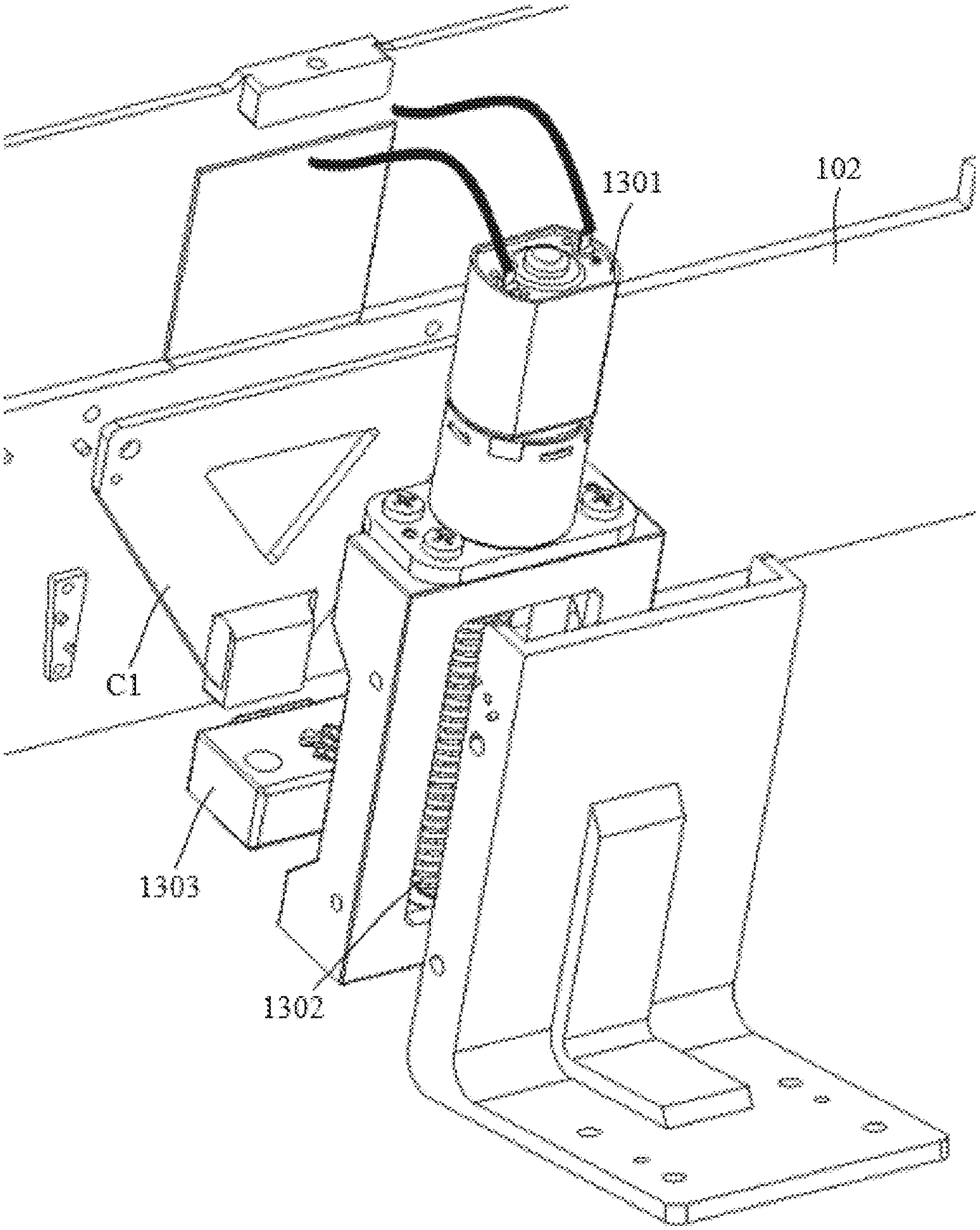
FIG. 15 is an exploded schematic assembling diagram of another second drive assembly according to some embodiments of the present disclosure.

In a second possible embodiment, referring to FIGS. 12 and 15, FIG. 15 is an exploded schematic assembling diagram of another second drive assembly according to some embodiments of the present disclosure. The second drive assembly 1300 includes a second drive motor 1301, a second transmission shaft 1302, and a second transmission member 1303, the second drive motor 1301 is disposed on a side, away from the first planar display portion 502, of the slide member 102 of the flexible display panel 500 and is fixedly connected to the second housing 200, and the second drive motor 1301 is connected to an end of the second transmission shaft 1302. The second transmission member 1303 is sleeved on the second transmission shaft 1302, and the second transmission member 1303 is connected to the side, away from the first planar display portion 502, of the slide member 102, and a length direction of the second transmission shaft 1302 is parallel to a moving direction of the slide member 102. The second drive motor 1301 is electrically connected to the circuit board 1600, and this second drive motor 1301 is configured to cause the second transmission member 1303 to drive the slide member 102 to move along a direction parallel to the length direction of the second transmission shaft 1302 in the case that the second transmission shaft 1302 is driven to rotate. In this way, in the case that the second drive motor 1301 is fixed to the second housing 200 and the second transmission member 1303 is fixedly connected to the slide member 102, the second drive motor 1301 drives the second transmission shaft 1302 to rotate and causes the second transmission member 1303 to move on the second transmission shaft 1302, such that the slide member 102 moves relative to the fixing member 101. For example, the second drive motor 1301 is fixed to the second housing 200 via the third support base B2, and the second transmission member 1303 is fixed to the slide member 102 via the fourth support base C1.

Figure 16:
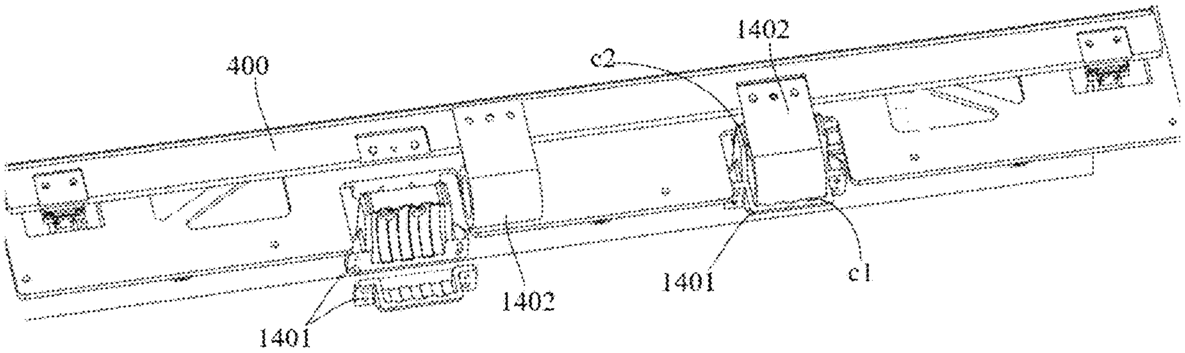
FIG. 16 is a schematic assembling diagram of an elastic restoring assembly according to some embodiments of the present disclosure.

Optionally, referring to FIG. 12 and FIG. 16, FIG. 16 is a schematic assembling diagram of an elastic restoring assembly according to some embodiments of the present disclosure. The elastic restoring assembly 1400 of the display device includes a support member 1401 fixed to the side, away from the roller 300, of the second housing 200, and a coil spring 1402 connected to the support member 1401, and an end of the coil spring 1402 is connected to the side, away from the roller 300, of the force receiving member 400. In this way, in the process of unrolling the display device, the force receiving member 400 can drive at least a portion of the coil spring 1402 to extend in the case that the force receiving member 400 moves along a direction close to the roller 300, and the coil spring 1402 can apply a force to the force receiving member 400 simultaneously in the direction away from the roller 300, in order to provide a tensioning force to the flexible display panel 500 through the force receiving member 400. In the present disclosure, as shown in FIG. 16, the support member 1401 in the flexible restoring assembly 1400 has a limiting chamber c1, and an opening region c2 communicated with the limiting chamber c1, at least a portion of the coil spring 1402 is mounted within the limiting chamber c1, and an end of the coil spring 1402 extends out of the limiting chamber c1 via the opening region c2 on the support member 1401 to be fixedly connected to the force receiving member 400. In this way, the coil spring 1402 can be mounted in the limiting chamber c1 and limited by the limiting chamber c1 in the support member 1401, such that the coil spring 1402 is not separated from the support member 1401 during the process of unrolling or rolling.

Figure 17:
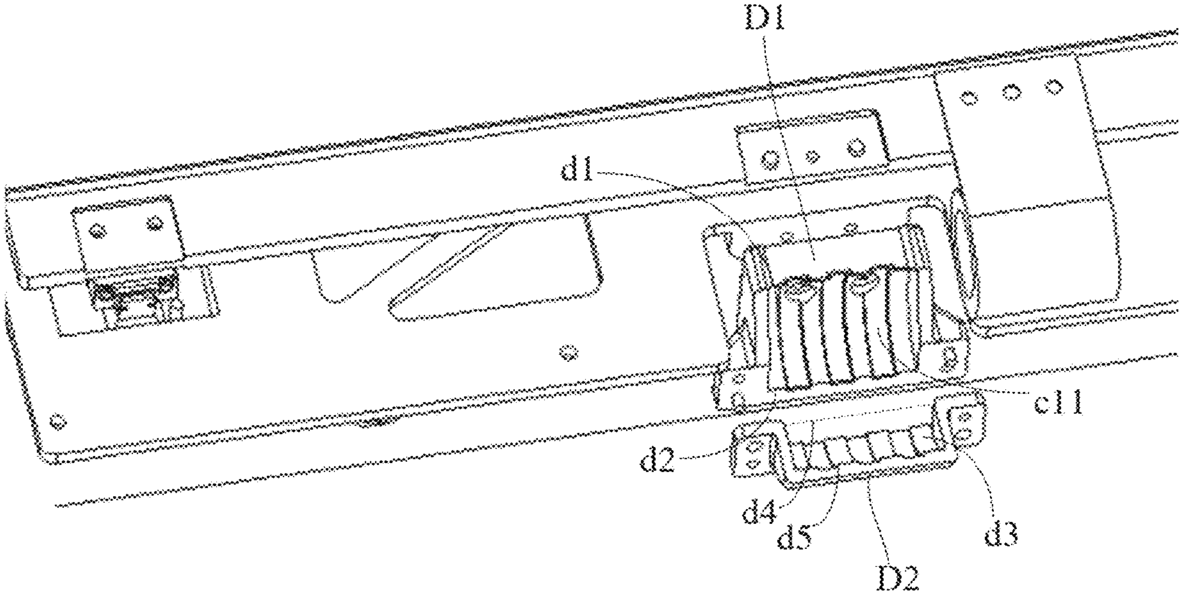
FIG. 17 is a schematic diagram of a connection between a support member and a force receiving member according to some embodiments of the present disclosure.

In the embodiments of the present disclosure, referring to FIGS. 16 and 17, FIG. 17 is a schematic diagram of a connection between a support member and a force receiving member according to some embodiments of the present disclosure. The support member 1401 of the elastic restoring assembly 1400 includes a first sub-support member D1 and a second sub-support member D2, a first arcuate slide groove d1 and a third opening d2 communicated with the first arcuate slide groove d1 are disposed in the first sub-support member D1, and a second arcuate slide groove d3, and a fourth opening d4 and a fifth opening d4 communicated with the second arcuate slide groove d3 are disposed in the second sub-support member D2. The second sub-support member D2 is fixedly connected to the first sub-support member D1 at the third opening d2 of the first sub-support member D1, and the second arcuate slide groove d3 in the second sub-support member D2 is communicated with the first arcuate slide groove d1 in the first sub-support member D1 via the fourth opening d4 and the third opening d2 on the first sub-support member D1. The second arcuate slide groove d3 and the first arcuate slide groove d1 communicated with each other can enclose a limiting chamber c1 in the support member 1401, and the fifth opening d5 in the second sub-support member D2 and the region of the third opening d2 in the first sub-support member D1 that is not covered by the second sub-support member D2 can enclose an opening region c2 in the support member 1401. For example, the arc degree of the first arcuate slide groove d1 is 180°, and the arc degree of the second arcuate slide groove d3 is 90°. The limiting chamber c1 enclosed by the first arcuate slide groove d1 and the second arcuate slide groove d3 can limit the coil spring 1402, preventing the coiling spring 1402 from disengaging from the support member 1401, and the coil spring 1402 can rotate smoothly within the limiting chamber c1.

Optionally, as shown in FIGS. 16 and 17, a plurality of strip weight-reducing recesses c11 are formed in the inner wall of the limiting chamber c1 in the support member 1401. In this way, by providing a plurality of strip weight-reducing recesses c11 on the inner wall of the limiting chamber c1, the weight of the support member 1401 is less, which facilitates a lightweight design of the display device. The opening of the plurality of weight-reducing recesses c11 can reduce the contact area between the coil spring 1402 and the inner wall of the limiting chamber c1 in the support member 1401, thereby reducing the frictional resistance of the coil spring 1402 in the process of extension and contraction.

Figure 18:
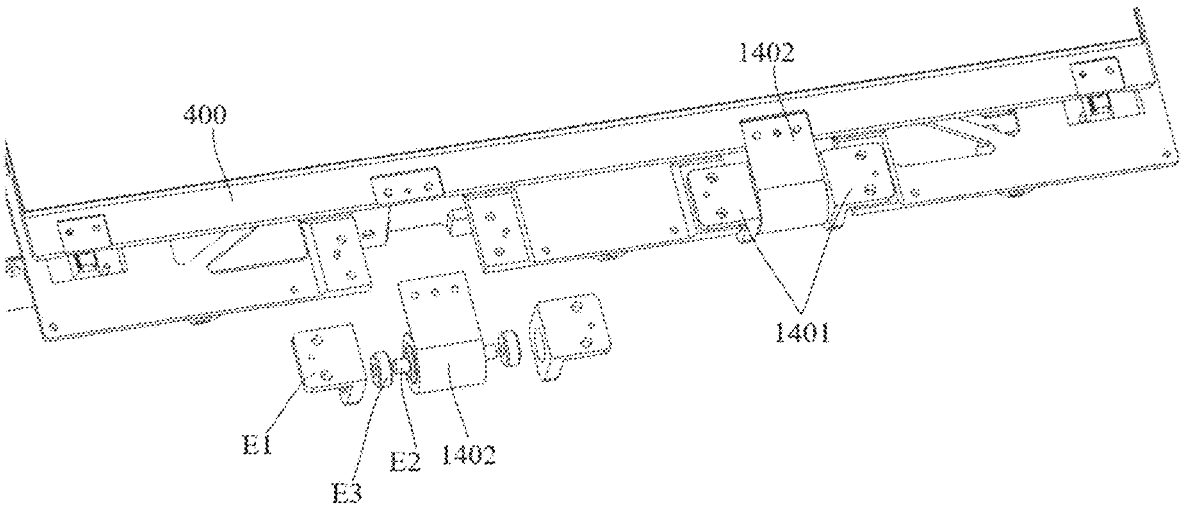
FIG. 18 is a schematic diagram of another connection between a support member and a force receiving member according to some embodiments of the present disclosure.

It is to be noted that in other possible implementations, referring to FIG. 18, FIG. 18 is a schematic diagram of another connection between a support member and a force receiving member according to some embodiments of the present disclosure. The support member 1401 includes two fixed bases E1 disposed opposite to each other and a connection shaft E2, the fixed bases E1 is fixedly connected to a side, away from the coil 300, of the second housing 200, the connecting shaft E2 is disposed between the two fixed bases E1, and the two ends of the connecting shaft E2 is rotatably connected to the two fixed bases E1 respectively. The coil spring 1402 is wound over the connecting shaft E2, and an end of the coil spring 1402 is fastened to the force receiving member 400. In this way, the connecting shaft E2 can be driven to rotate around the fixed bases during the extension or contraction of the coil spring 1402, ensuring that the coil spring 1402 can be easily extended or contracted. In the present disclosure, the support member 1401 further includes two second bearings E3, the outer ring of the second bearing E3 is fixedly connected to the fixed base E1, and the two ends of the connecting shaft E2 are connected to the inner rings of the two second bearings E3 respectively, such that smooth rotation of the connecting shaft E2 around the fixed base E1 is achieved.

In some embodiments of the present disclosure, as shown in FIGS. 4 and 5, the slide member 102 fixedly connected to the first planar display portion 502 in the flexible display panel 500 includes a plurality of first guide rods 102*a* arranged in parallel, and the arrangement direction of the plurality of first guide rods 102*a* is parallel to the extension direction of the roller 300. The fixing member 101 includes a plurality of second guide rods 101*c*, the plurality of second guide rods 101*c* is arranged in a direction parallel to the extension direction of the roller 300. The plurality of first guide rods 102*a* and the plurality of second guide rods 101*c* are alternately arranged in rows. In this way, by providing the plurality of first guide rods 102*a* with the slide member 102 connected to the first planar display portion 502, the plurality of second guide rods 101*c* are provided with the stationary member 101, and the plurality of first guide rods 102*a* and the plurality of second guide rods 101*c* are alternately arranged. In this way, during the movement of the slide member 102 relative to the fixing member 101, the plurality of first guide rods 102*a* and the plurality of second guide rods 101*c* can slide relative to each other, which can guide and limit the movement of the slide member 102 relative to the fixing member 101, such that the first planar display portion 502 connected to the slide member 102 is prevented from tilting, and the reliability of the display device is ensured. In the present disclosure, a first guide groove (not shown in the drawings) is formed between every two adjacent first guide rods, and a second guide rod is disposed in the first guide groove. A second guide groove (not shown in the figures) is formed between every two adjacent second guide rods, and the first guide rod is disposed in the second guide groove.

Figure 19:
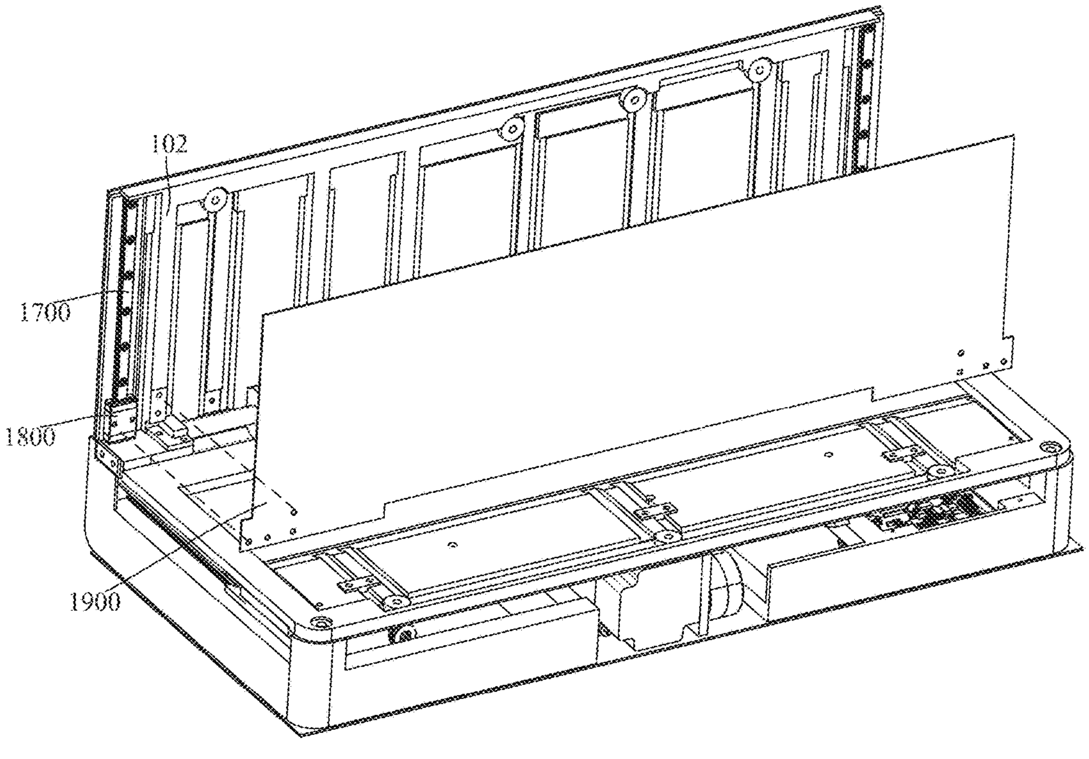
FIG. 19 is a schematic diagram of a partial structure of a display device according to some embodiments of the present disclosure.

Optionally, referring to FIGS. 13 and 19, FIG. 19 is a schematic diagram of a part of the structure of a display device provided in another embodiment of the present disclosure. The display device further includes a first guide rail 1700 and a first slide block 1800, the first guide rail 1700 is fixed to the fixing member 101, a length direction of the first guide rail 1700 is parallel to a sliding direction of the slide member 102 relative to the fixing member 101, the first slide block 1800 is fixedly connected to the slide member 102, and the first slide block 1800 is sleeved on the first guide rail 1700 and slidably connected to the first guide rail 1700. In this way, the cooperation of the first guide rail 1700 and the first slide block 1800 can ensure the stability of the slide member 102 in the case that the slide member 102 moves relative to the fixing member 101, which improves the user's experience. It is to be noted that, in other possible implementations, the first guide rail 1700 is fixed to the slide member 102, and the length direction of the first guide rail 1700 is parallel to the sliding direction of the slide member 102 relative to the fixing member 101, the first slide block 1800 is fixedly connected to the fixing member 101, and the first slide block 1800 is sleeved to the first rail 1700 and slidably connected to the first guide rail 1700. As in FIG. 19, in order to facilitate the connection between the slide member and the first slider, the display device further includes a first adapter 1900, the first adapter 1900 is disposed on the side, away from the first planar display portion 502, of the slide member 102, the first adapter 1900 is connected to the first slide block 1800 and the slide member, and the first adapter 1900 can cover the back side of the slide member 102.

Figure 20:
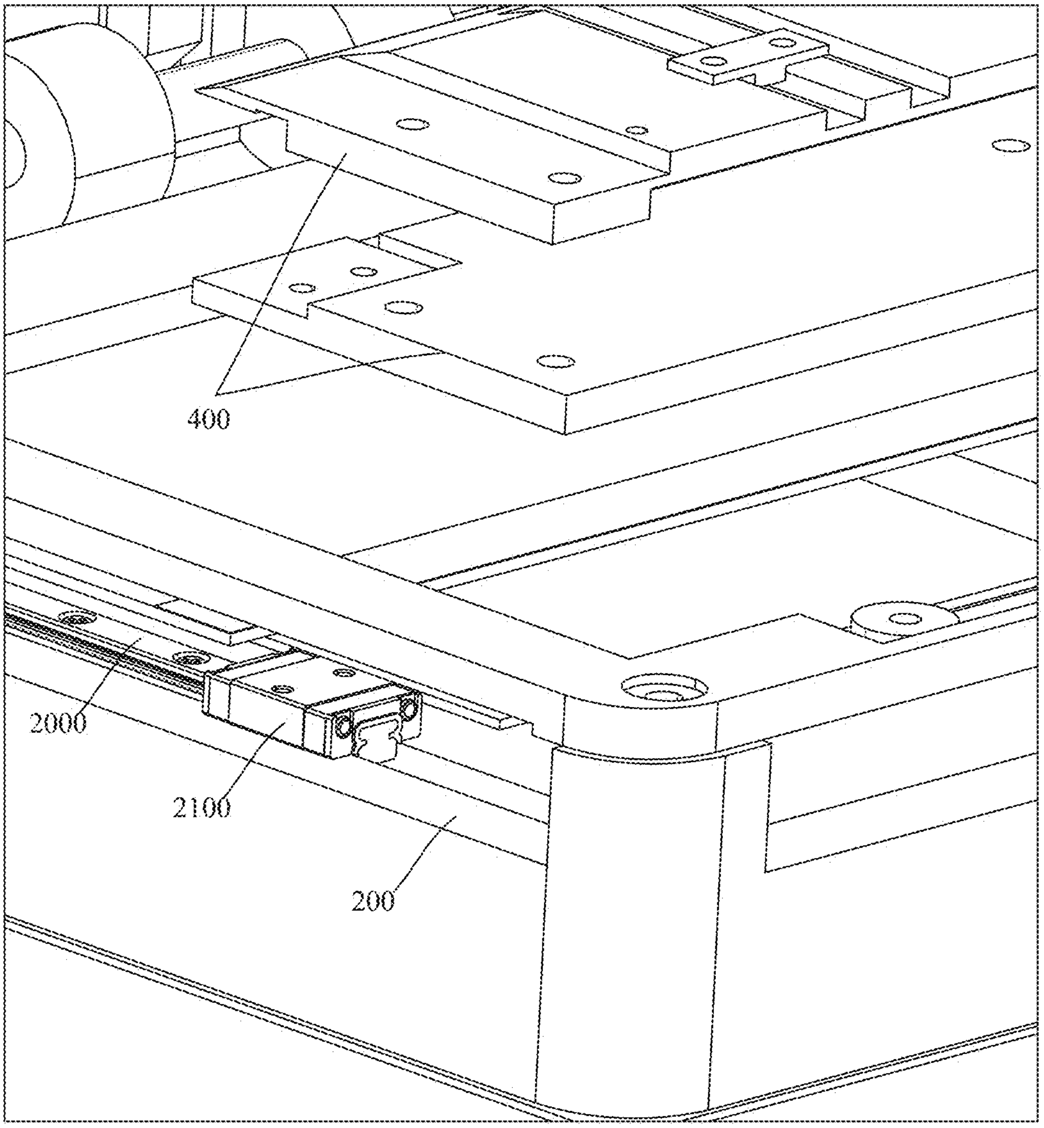
FIG. 20 is a schematic diagram of a partial structure of another display device according to some embodiments of the present disclosure.

In some embodiments of the present disclosure, referring to FIG. 20, FIG. 20 is a schematic diagram of a partial structure of another display device according to some embodiments of the present disclosure. The display device further includes a second guide rail 2000 and a second slide block 2100, the second guide rail 2000 can be fixed to the second housing 200, and a length direction of the second guide rail 2000 is parallel to a sliding direction of the force receiving member 400, the second slide block 2100 is fixedly connected to the force receiving member 400, and the second slide block 2100 is sleeved on the second guide rail 200 and is slidably connected to the second guide rail 2000. In this way, by the cooperation between the second guide rail 2000 and the second slide block 2100, the force receiving member 400 is not deviated from the undesirable phenomenon in the moving process, and the force receiving member 400 can be limited in the direction perpendicular to the plane where the second housing 200 is located, such that the second planar display portion 503 of the flexible display panel 500 is prevented from arching in the moving process.

Figure 21:
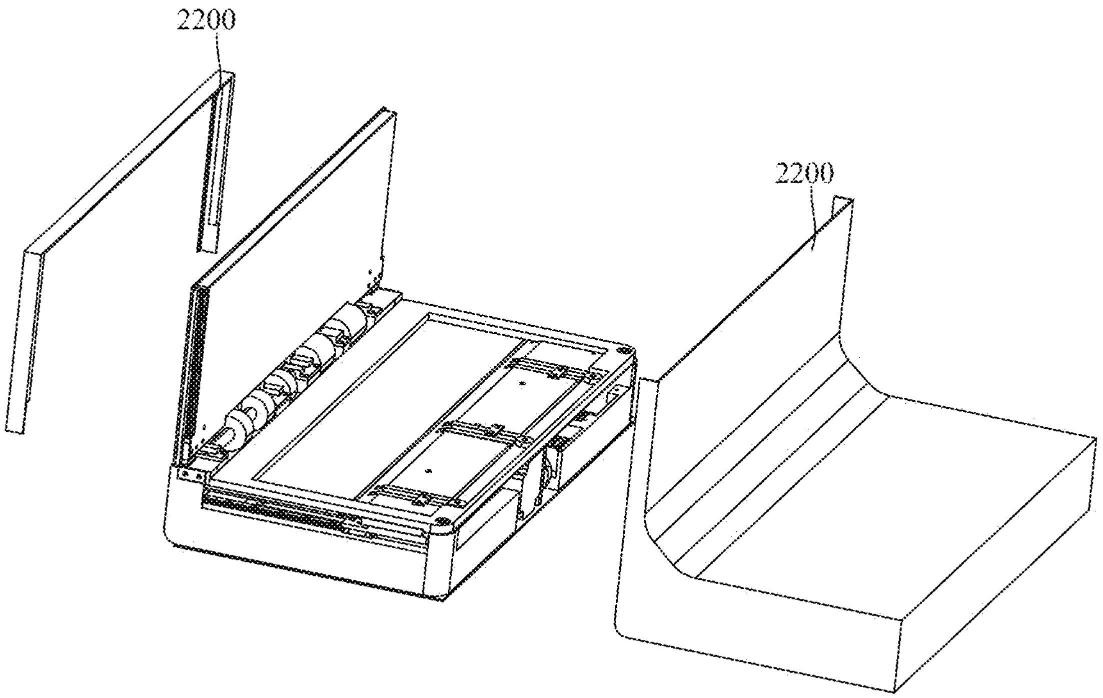
FIG. 21 is an exploded schematic diagram of another display device according to some embodiments of the present disclosure.

Optionally, referring to FIG. 12 and FIG. 21, FIG. 21 is an exploded schematic diagram of another display device according to some embodiments of the present disclosure. The display device further includes a wrapping member 2200, and the wrapping member 2200 covers the sides and the back of the display device to provide protection to the internal devices of the display device, which improves the aesthetics of the display device.

In summary, embodiments of the present disclosure provide a display device including a first housing, a second housing, a roller, a force receiving member and a flexible display panel. By providing the roller between the first housing and the second housing, and in the case that a first planar display portion of the flexible display panel is connected to the slide member and a second planar display portion is connected to the force receiving member, the rollable display portion in the flexible display panel can be wound over the roller. The roller is rotatably connected to the housing, such that indirect rotation of the rollable display portion in the flexible display panel is achieved when the rollable display portion passes over the roller region, and the friction of the rollable display portion in the flexible display panel is reduced, in order to reduce the frictional resistance of the display device in the case that the display device is switched between the unrolled state and the rolled state. In addition, by arranging the roller including a plurality of sub-rollers arranged in an array, the sub-rollers are shorter and easy to be processed, the axial accuracy of the sub-roller can be ensured, and the coaxial degree of the formed roller can be ensured to be better upon assembling the plurality of sub-rollers on the housing, such that the rollable display portion in the flexible display panel does not have the undesirable phenomenon of warping or collapsing when the rollable display portion passes over the roller region, and a better display effect of the flexible display panel in the display device is ensured.

Figure 22:
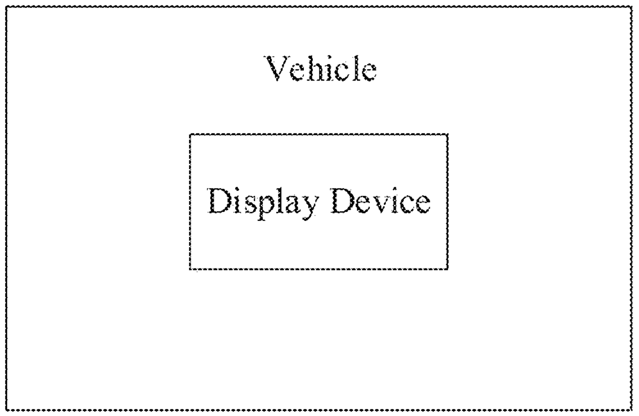
FIG. 22 is a block diagram of a vehicle according to some embodiments of the present disclosure.

Embodiments of the present disclosure further provide a vehicle, referring to FIG. 22, FIG. 22 is a block diagram of a vehicle according to some embodiments of the present disclosure. The vehicle includes a display device fixed within a cabin of the vehicle, and the display device is a display device in any of the above embodiments. For example, the vehicle is a car or a ship or the like having the function of carrying, and the display device is fixed in a cockpit or a passenger compartment of the vehicle. For example, the display device is fixed to a vehicle dashboard, a roof or a base in the driver's compartment of the vehicle.

Figure 23:
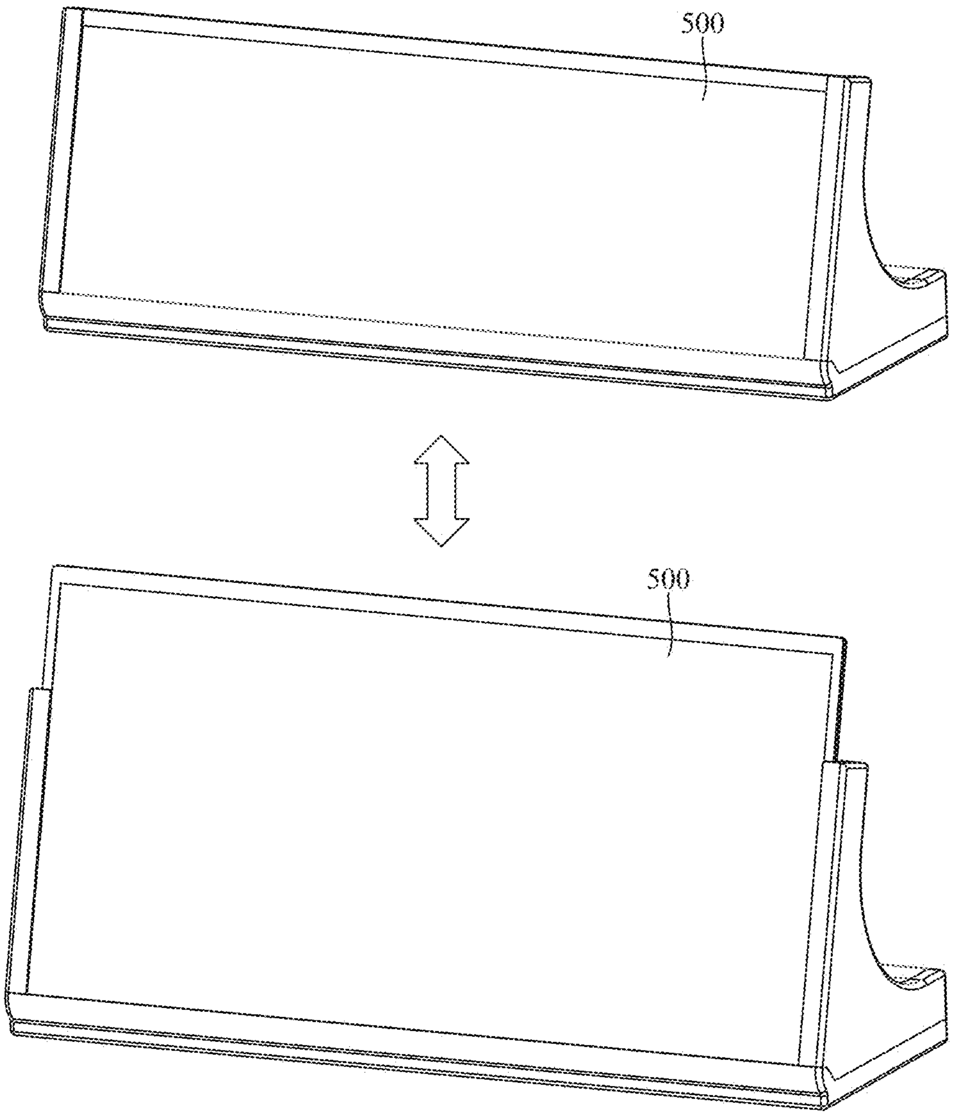
FIG. 23 is a schematic diagram of the effect of restoring and unfolding the display device in a vehicle according to some embodiments of the present disclosure.

In this way, referring to FIG. 23, FIG. 23 is a schematic diagram of the effect of restoring and unfolding the display device in a vehicle according to some embodiments of the present disclosure. In the case that the display device is applied in the vehicle (e.g., a vehicle), it is possible to flexibly adjust the extension dimension of the flexible display panel of the display device, such that the flexible display panel is applicable to different usage scenarios of the vehicle. In this way, the requirements for user entertainment and safety can be satisfied, and the installation space requirements are lower for the vehicle. In particular, for the large-dimension flexible display panel, the dimension of the flexible display panel can be adjusted based on different usage scenarios in the vehicle environment. For example, in the case that the vehicle is moving, a portion of the flexible display panel is disposed in the internal space of the display device to reduce the display area of the flexible display panel, and a smaller display is used to provide driving information of the vehicle, which provides a good driving field of view. In the case that the vehicle is in an entertainment state, a larger portion or all of the flexible display panel extends out of the internal space of the display device, increasing the display area and satisfying the user's entertainment requirements.

It is to be noted that in the accompanying drawings, the dimensions of the layers and regions may be exaggerated for the clarity of illustration. And it should be understood that when an element or layer is referred to as being "on" another element or layer, it may be directly on the other element or an intermediate layer may be present. In addition, it should be understood that when the element or layer is referred to as being "under" another element or layer, it can be directly under the other element, or more than one intermediate layer or element can be present. It should also be understood that when a layer or element is referred to as being "between" two layers or elements, it may be the only layer between the two layers or elements, or more than one intermediate layer or element may also be present. Similar reference marks throughout indicate similar elements.

In the application, the terms "first," "second," "third," "fourth," and "fifth" are used for descriptive purposes only and are not to be construed as indicating or implying relative importance. The term "plurality" refers to two or more, unless otherwise expressly limited.

The foregoing are only optional embodiments of the present disclosure and are not intended to limit the application, and any modifications, equivalent substitutions, improvements, or the like, within the spirit and principles of the present disclosure shall be included in the scope of protection of the present disclosure.

The invention claimed is:

1. A display device, comprising:

a first housing, comprising: a fixing member, and a slide member slidably connected to the fixing member;

a second housing, fixedly connected to a side, away from the slide member, of the fixing member, wherein an angle between the first housing and the second housing is less than 180°;

a roller, comprising: a plurality of sub-rollers arranged in an array, wherein the sub-rollers are rotatably connected to at least one of the first housing or the second housing;

a force receiving member, disposed within the second housing and movably connected to the second housing; and a flexible display panel, comprising: a rollable display portion wound over the plurality of sub-rollers, and a first planar display portion and a second planar display portion disposed on both sides of the rollable display portion, wherein the first planar display portion is connected to the slide member, and the second planar display portion is connected to the force receiving member within the second housing;

wherein the each of the sub-rollers comprises a rotation shaft and a drum sleeved on the rotation shaft; and wherein two ends of the rotation shaft are fixedly connected to the fixing member, and the drum is rotatably connected to the rotation shaft; or two ends of the rotation shaft are rotatably connected to the fixing member, and the drum is fixedly connected to the rotation shaft.

2. The display device according to claim 1, further comprising a plurality of first support bases and a plurality of second support bases, wherein the plurality of first support bases and the plurality of second support bases are fixedly connected to the fixing member;

wherein the plurality of first support bases and the plurality of second support bases are in one-to-one correspondence with the plurality of sub-rollers, the sub-roller is disposed between the first support base and the second support base corresponding to the sub-roller, a first end of the rotation shaft of the sub-roller is connected to the first support base corresponding to the sub-roller, and a second end of the rotation shaft of the sub-roller is connected to the second support base corresponding to the sub-roller.

3. The display device according to claim 2, wherein the first support base and the second support base disposed between two adjacent sub-rollers are fixedly connected to each other.

4. The display device according to claim 1, wherein the display device further comprises a second drive assembly disposed within the first housing and an elastic restoring assembly fixed within the second housing;

wherein the second drive assembly is connected to the slide member, a portion of the second drive assembly extends into the second housing and is fixedly connected to the second housing, and the elastic restoring assembly is connected to a side, away from the roller, of the force receiving member; and the second drive assembly is configured to drive the slide member within the first housing to move relative to the fixing member in a direction perpendicular to the roller.

5. The display device according to claim 4, further comprising: a functional device and a circuit board; wherein the functional device and the second drive assembly are electrically connected to the circuit board; and the functional device and the circuit board are fixed to a side, away from the first planar display portion, of the slide member.

6. The display device according to claim 5, wherein the second drive assembly comprises: a second drive motor, a second transmission shaft and a second transmission member, wherein the second drive motor is fixed to the side, away from the first planar display portion, of the slide member, the second drive motor is connected to an end of the second transmission shaft, and a portion of the second transmission member is sleeved on the second transmission shaft, another portion of the second transmission member extends into the second housing and is fixedly connected to the second housing, and a length direction of the second transmission shaft is parallel to a movement direction of the slide member;

wherein the second drive motor is electrically connected to the circuit board, and the second drive motor is configured to, in response to driving the second transmission shaft to rotate, move along the length direction of the second transmission shaft together with the second transmission shaft.

7. The display device according to claim 5, wherein the second drive assembly comprises: a second drive motor, a second transmission shaft and a second transmission member, wherein the second drive motor is disposed on the side, away from the first planar display portion, of the slide member and fixedly connected to the second housing, the second drive motor is connected to an end of the second transmission shaft, the second transmission member is sleeved on the second transmission shaft, the second transmission member is connected to the side, away from the first planar display portion, of the slide member, and a length direction of the second transmission shaft is parallel to a movement direction of the slide member;

wherein the second drive motor is electrically connected to the circuit board, and the second drive motor is configured to, in response to driving the second transmission shaft to rotate, cause the second transmission member to move the slide member along a direction parallel to the length direction of the second transmission shaft.

8. The display device according to claim 5, wherein the elastic restoring assembly comprises a support member fixed to a side, away from the roller, of the second housing, and a coil spring connected to the support member, wherein an end of the coil spring is connected to a side, away from the roller, of the force receiving member.

9. The display device according to claim 8, wherein the support member has a limiting chamber, and an opening region communicated with the limiting chamber, wherein at least a portion of the coil spring is mounted within the limiting chamber, and an end of the coil spring extends out of the limiting chamber through the opening region.

10. The display device according to claim 9, wherein the support member comprises a first sub-support member and a second sub-support member, wherein a first arcuate slide groove and a third opening communicated with the first arcuate slide groove is disposed in the first sub-support member, and a second arcuate slide groove, and a fourth opening and a fifth opening communicated with the second arcuate slide groove are disposed in the second sub-support member;

wherein the second sub-support member is connected to the first sub-support member at the third opening, the second arcuate slide groove is communicated with the first arcuate slide groove through the fourth opening and the third opening, the second arcuate slide groove and the first arcuate slide groove are configured to enclose the limiting chamber, and the fifth opening and a region not covered by the second sub-support member within the third opening enclose the opening region.

11. The display device according to claim 9, wherein a plurality of weight-reducing recesses are formed in the inner wall of the limiting chamber.

12. A vehicle, comprising: a display device fixed within a cabin of the vehicle, wherein the display device is the display device as defined in claim 1.

13. A display device, comprising:

a first housing, comprising: a fixing member, and a slide member slidably connected to the fixing member;

a second housing, fixedly connected to a side, away from the slide member, of the fixing member, wherein an angle between the first housing and the second housing is less than 180°;

a roller, comprising: a plurality of sub-rollers arranged in an array, wherein the sub-rollers are rotatably connected to at least one of the first housing or the second housing;

a force receiving member, disposed within the second housing and movably connected to the second housing; and a flexible display panel, comprising: a rollable display portion wound over the plurality of sub-rollers, and a first planar display portion and a second planar display portion disposed on both sides of the rollable display portion, wherein the first planar display portion is connected to the slide member, and the second planar display portion is connected to the force receiving member within the second housing;

the display device further comprising: a first pulley, a second pulley, and a tensioning rope; wherein the first pulley is connected to a side, away from the roller, of the fixing member, and the second pulley is connected to a side, away from the roller, of the second housing; and a first end of the tensioning rope is fixedly connected to a side, close to the roller, of the slide member, the tensioning rope is sequentially wound over the first pulley, the roller, and the second pulley, and a second end of the tensioning rope is fixedly connected to a side, away from the roller, of the force receiving member;

wherein the first end of the tensioning rope is always disposed on a side, toward the roller, of the first pulley during sliding of the slide member relative to the fixing member.

14. The display device according to claim 13, further comprising at least one of a first tensioning assembly or a second tensioning assembly; wherein the first tensioning assembly is connected to the first pulley and the fixing member, and the first tensioning assembly is configured to supply a force in a direction away from the roller to the first pulley; and the second tensioning assembly is connected to the second pulley and the second housing, and the second tensioning assembly is configured to supply a force in a direction away from the roller to the second pulley.

15. The display device according to claim 14, wherein the first tensioning assembly comprises a first elastic element, a first connection block, and a first fastener, wherein an end of the first fastener is fixedly connected to the side, away from the roller, of the fixing member, an extension direction of the first fastener is intersected with the roller, the first connection block and the first elastic element are sleeved on the first fastener, the first elastic element is disposed between the fixing member and the first connection block, two ends of the first elastic element are abutted against the fixing member and the first connection block respectively, an end, away from the fixing member, of the first fastener is abutted against a side, away from the fixing member, of the first connection block, and the first pulley is rotatably connected to the first connection block; and/or the second tensioning assembly comprises a second elastic element, a second connection block, and a second fastener, wherein an end of the second fastener is fixedly connected to the side, away from the roller, of the second housing, an extension direction of the second fastener is intersected with the roller, the second connection block and the second elastic element are sleeved on the second fastener, the second elastic element is disposed between the second housing and the second connection block, two ends of the second elastic element are abutted against the second housing and the second connection block respectively, an end, away from the second housing, of the second fastener is abutted against a side, away from the second housing, of the second connection block, and the second pulley is rotatably connected to the second connection block.

16. The display device according to claim 15, wherein the first connection block has a first mounting chamber and a first opening communicated with the first mounting chamber, wherein the first pulley is disposed in the first mounting chamber and rotatably connected to the first connection block, the first opening faces the roller, and the first opening is configured to allow the tensioning rope to run through; and/or the second connection block has a second mounting chamber and a second opening communicated with the second mounting chamber, wherein the second pulley is disposed within the second mounting chamber and rotatably connected to the second connection block, the second opening is facing the roller, and the second opening is configured to allow the tensioning rope to run through.

17. The display device according to claim 14, wherein the first pulley comprises a first pulley body and a first pin, wherein an end of the first pin is connected to the fixing member, and the first pulley body is sleeved on the first pin and rotatably connected to the first pin; and the second pulley comprises a second pulley body and a second pin, wherein an end of the second pin is connected to the second housing, the second pulley body is sleeved on the second pin and rotatably connected to the second pin;

wherein an axial direction of the first pin is perpendicular to a plane where the first housing is located, and/or an axial direction of the second pin is perpendicular to a plane where the second housing is located.

18. The display device according to claim 14, further comprising a first drive assembly, wherein the first drive assembly is fixed within the second housing, the first drive assembly is connected to the force receiving member, and the first drive assembly is configured to drive the force receiving member within the second housing to move in a direction perpendicular to the roller.

19. A display device, comprising:

a first housing, comprising: a fixing member, and a slide member slidably connected to the fixing member;

a second housing, fixedly connected to a side, away from the slide member, of the fixing member, wherein an angle between the first housing and the second housing is less than 180°;

a roller, comprising: a plurality of sub-rollers arranged in an array, wherein the sub-rollers are rotatably connected to at least one of the first housing or the second housing;

a force receiving member, disposed within the second housing and movably connected to the second housing; and a flexible display panel, comprising: a rollable display portion wound over the plurality of sub-rollers, and a first planar display portion and a second planar display portion disposed on both sides of the rollable display portion, wherein the first planar display portion is connected to the slide member, and the second planar display portion is connected to the force receiving member within the second housing;

wherein the slide member comprises a plurality of first guide rods arranged in parallel;

the fixing member comprises a plurality of second guide rods arranged in parallel; and the plurality of first guide rods and the plurality of second guide rods are alternately arranged in rows.

* * * * *